United States Patent
Yoshizawa et al.

(10) Patent No.: US 6,390,057 B2
(45) Date of Patent: May 21, 2002

(54) COMPRESSION SELF-IGNITION GASOLINE ENGINE

(75) Inventors: Koudai Yoshizawa, Kanagawa; Ken Naitoh, Yamagata; Atushi Teraji; Eiji Aochi, both of Yokohama; Hiroshi Miyakubo, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/734,890

(22) Filed: Dec. 13, 2000

(30) Foreign Application Priority Data

Dec. 14, 1999 (JP) .......................... 11-355101
Jan. 28, 2000 (JP) ....................... 2000-020549

(51) Int. Cl.⁷ .......................... F02B 17/00; F02M 25/07
(52) U.S. Cl. ..................... 123/295; 123/301; 123/302; 123/430; 123/568.14
(58) Field of Search ............... 123/90.15, 295, 123/299, 300, 301, 302, 305, 308, 430, 432, 568.14, 568.21

(56) References Cited

U.S. PATENT DOCUMENTS

| 4,193,382 A | * | 3/1980 | Oshima ............... 123/295 X |
| 4,414,940 A |   | 11/1983 | Loyd ...................... 123/299 |
| 5,535,716 A |   | 7/1996 | Sato et al. ............... 123/279 |
| 5,555,859 A | * | 9/1996 | Melchior et al. ......... 123/79 C |
| 5,765,525 A | * | 6/1998 | Ma ......................... 123/308 |
| 6,135,088 A |   | 10/2000 | Duret ....................... 123/430 |
| 6,318,348 B1 | * | 11/2001 | Xu .......................... 123/430 X |

FOREIGN PATENT DOCUMENTS

| AT | 003 135 | 10/1999 |
| EP | 1 083 324 | 3/2001 |
| EP | 1 085 192 | 3/2001 |
| FR | 2 768 180 | 3/1999 |
| GB | 2 327 980 | 2/1999 |
| JP | 7-332141 | 12/1995 |
| JP | 11-182246 | 7/1999 |

* cited by examiner

*Primary Examiner*—Tony M. Argenbright
(74) *Attorney, Agent, or Firm*—Foley & Lardner

(57) ABSTRACT

A compression self-ignition gasoline engine includes a stratifying device stratifying gas in a combustion chamber of the engine, a fuel injector directly injecting fuel in the combustion chamber and a controller connected to the stratifying device and the fuel injector. The controller controlling the stratifying device to produce a high temperature gas layer of a high temperature gas and a low temperature gas layer of a low temperature gas in the combustion chamber. The controller further controls the fuel injector to inject the fuel to both the high temperature gas layer and the low temperature gas layer.

14 Claims, 33 Drawing Sheets

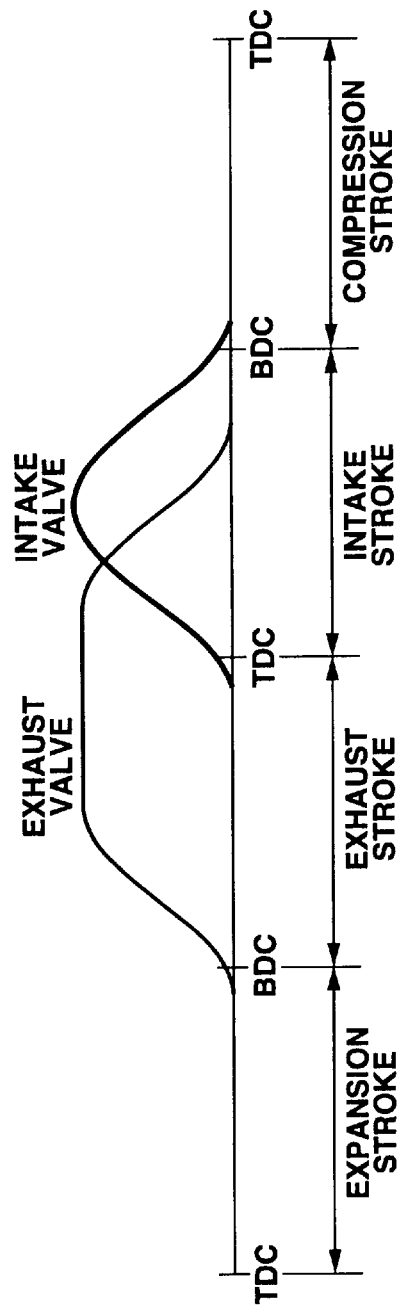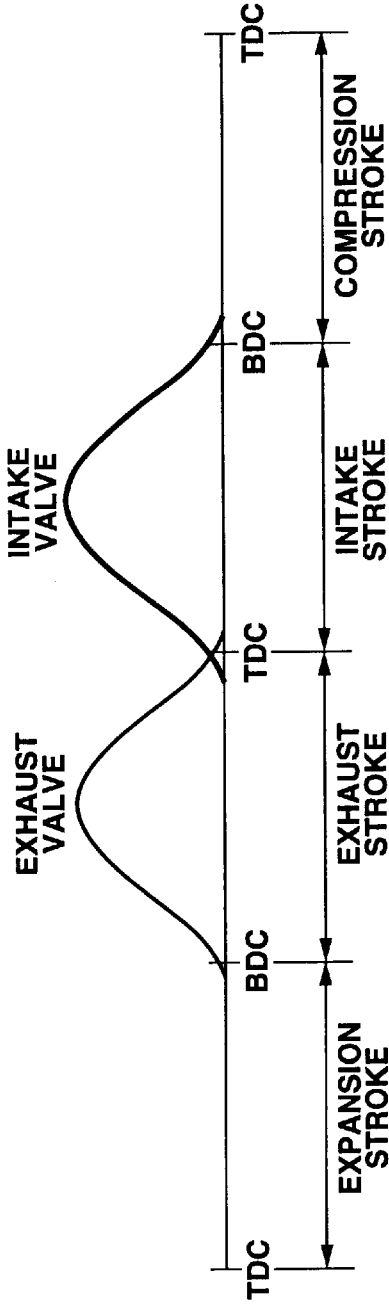

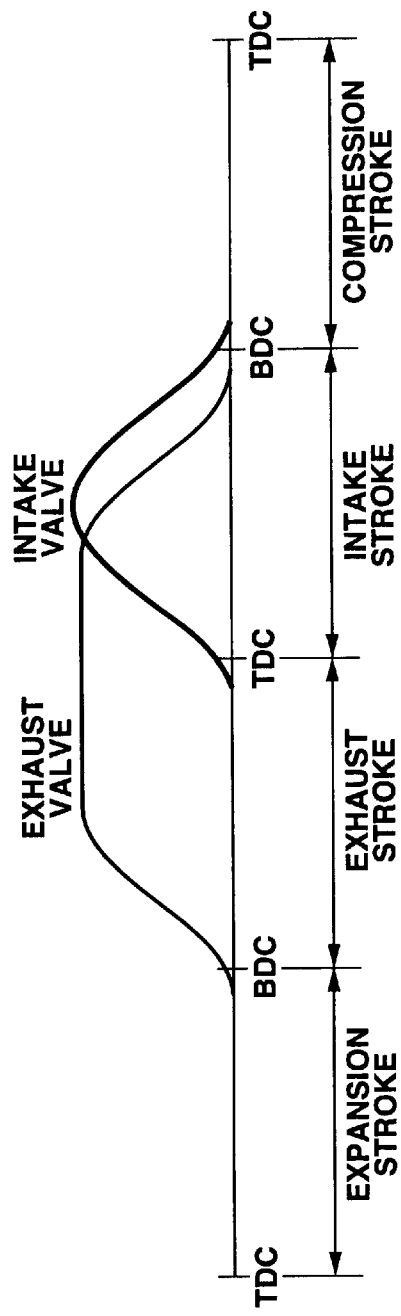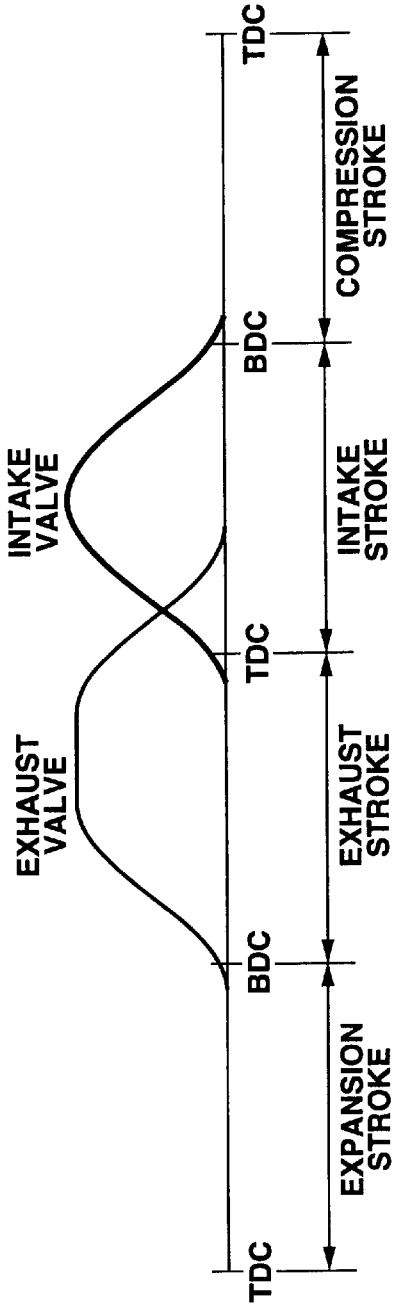

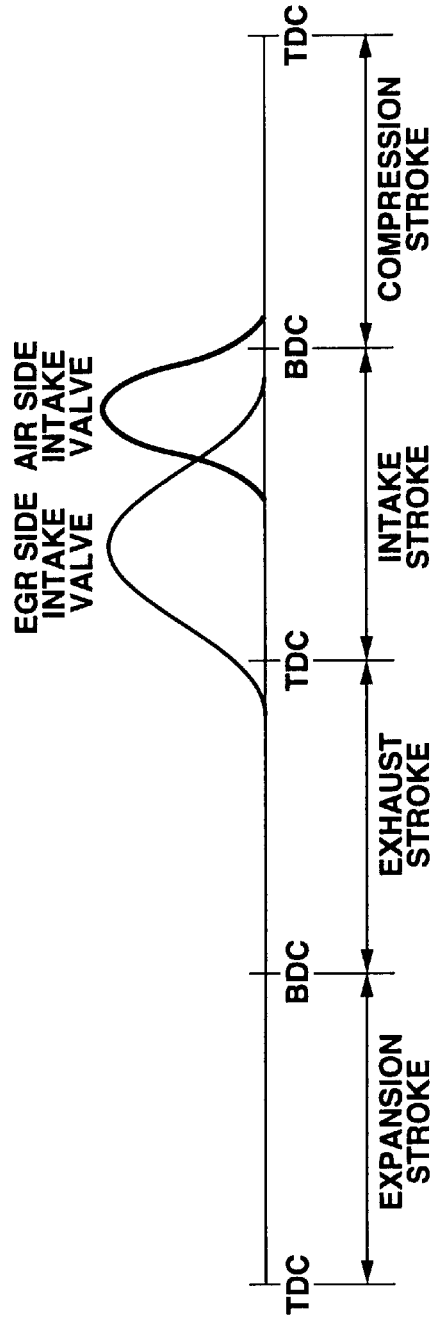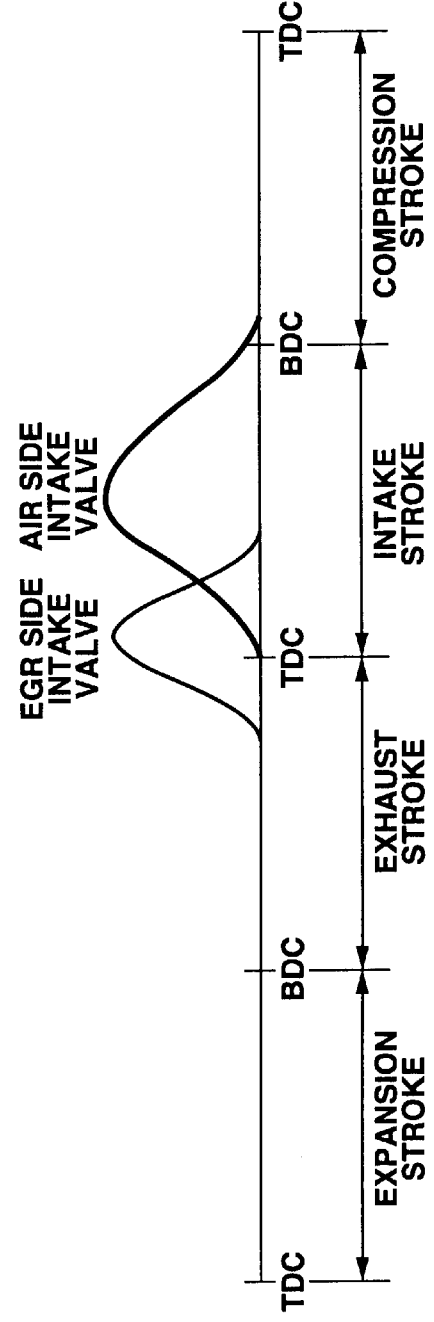

CENTER

COMPRESSION SELF-IGNITION GASOLINE ENGINE

BACKGROUND OF THE INVENTION

The present invention relates to a compression self-ignition gasoline engine which comprises a fuel injector injecting fuel directly into a combustion chamber and proceeds a combustion by self-igniting mixture in the combustion chamber due to the piston compression operation.

It is known that a theoretical thermal efficiency is improved by varying the air-fuel ratio of mixture toward a lean side to decrease a pumping loss and by increasing a ratio of a specific heat of operation gas for the purpose of improving the thermal efficiency of a gasoline engine. However, a spark-ignition type internal combustion engine has a tendency that a combustion period is elongated by varying as the air-fuel ratio to the lean side, thereby degrading a combustion stability of the engine. That is, such a spark-ignition type internal combustion engine has a limitation of varying the air-fuel ratio to the lean side.

Japanese Patent Provisional Publication No. 7-332141 discloses a compression self-ignition internal combustion engine that is arranged to generate a pre-mixing compression self-ignition combustion. This is proposed in order to achieve the stable engine operation under the lean air-fuel ratio. Further, Japanese Patent Provisional Publication No. 11-182246 discloses an internal combustion engine that is arranged to increase the temperature in each cylinder by returning exhaust gas to an intake passage. This is proposed in order to improve the ignitability of fuel during the self-ignition combustion.

SUMMARY OF THE INVENTION

Although the latter proposed engine improves a problem of the former proposed engine that the ignitability of fuel during the self-ignition combustion should be improved, in some degree, it is further required to improve the ignitability.

It is an object of the present invention to improve the ignitability of a gasoline engine during the compression self-ignition combustion at a wider engine operation region without generating knocking.

A first aspect of the present invention resides in a compression self-ignition gasoline engine which comprises a stratifying device stratifying gas in a combustion chamber of the engine, a fuel injector directly injecting fuel in the combustion chamber and a controller connected to the stratifying device and the fuel injector. The controller controls the stratifying device to produce a high temperature gas layer of a high temperature gas and a low temperature gas layer of a low temperature gas in the combustion chamber. The controller controls the fuel injector to inject the fuel to both the high temperature gas layer and the low temperature gas layer.

Another aspect of the present invention resides in a compression self-ignition gasoline engine which comprises a stratifying device which stratifies gas in a combustion chamber of the engine and a fuel injecting which directly injects fuel in the combustion chamber. The stratifying device produces a high temperature gas layer of a high temperature gas and a low temperature gas layer of a low temperature gas in the combustion chamber. The fuel injector injects fuel to both the high temperature gas layer and the low temperature gas layer.

BRIEF DESCRIPTION OF THE DRAWINGS

FIG. 26A is a time chart showing a valve lifting characteristic during the compression self-ignition combustion.

FIG. 26B is a time chart showing a valve lifting characteristic during the spark-ignition combustion.

FIG. 28A is a time chart showing a valve lifting characteristic when the ratio of the EGR layer is large, according to a sixth embodiment of the present invention.

FIG. 28B is a time chart showing a valve lifting characteristic when the EGR layer is small, according to the sixth embodiment.

FIG. 31A is a time chart showing a valve lifting characteristic when the ratio of the EGR layer is large, according to the seventh embodiment.

FIG. 31B is a time chart showing a valve lifting characteristic when the EGR layer is small, according to the seventh embodiment.

DETAILED DESCRIPTION OF THE INVENTION

Referring to drawings, there will be discussed embodiments according to the present invention.

Figure 1:
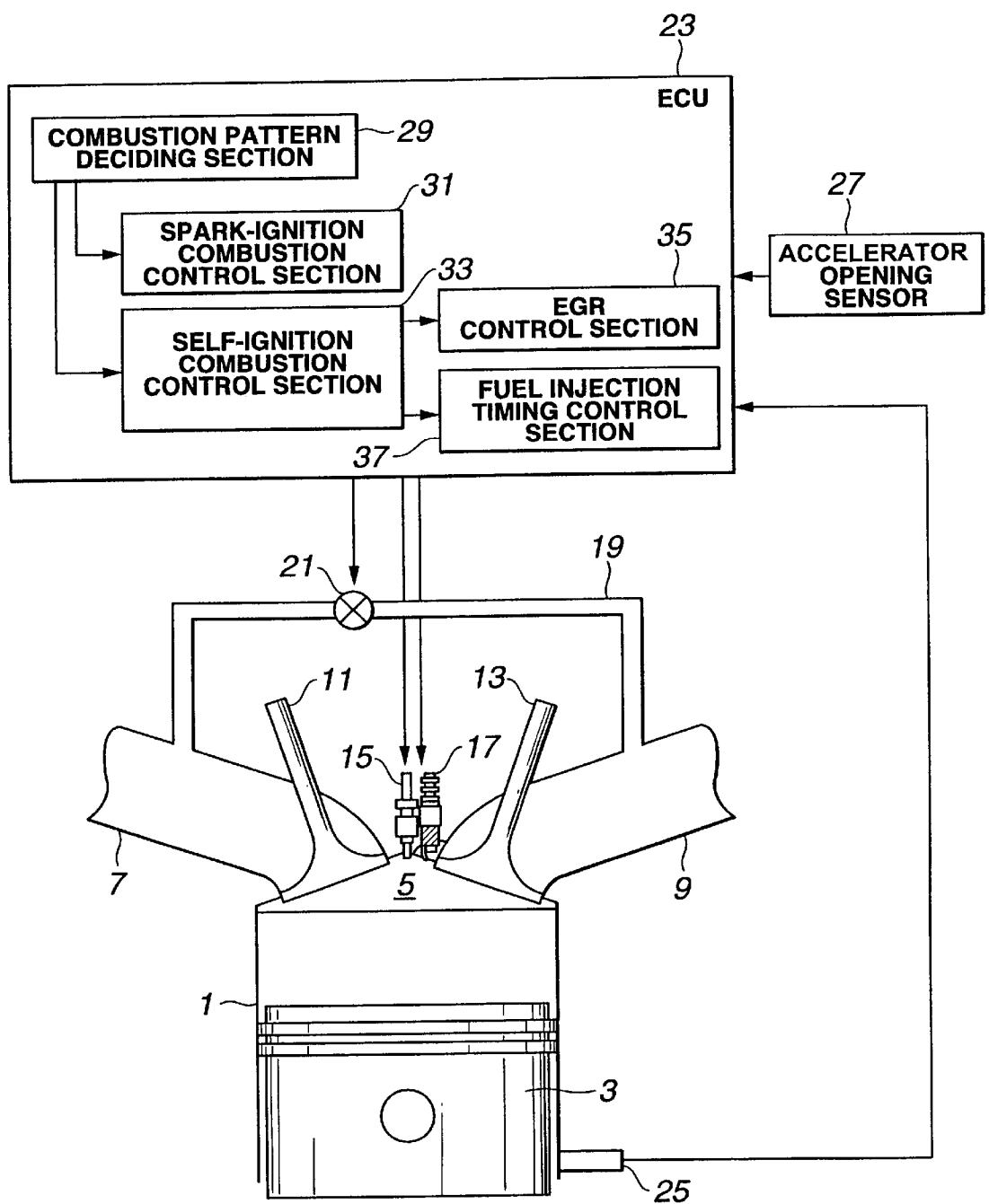
FIG. 1 is a schematic view showing a construction of a compression self-ignition type internal combustion engine according to a first embodiment of the present invention.
Figure 2:
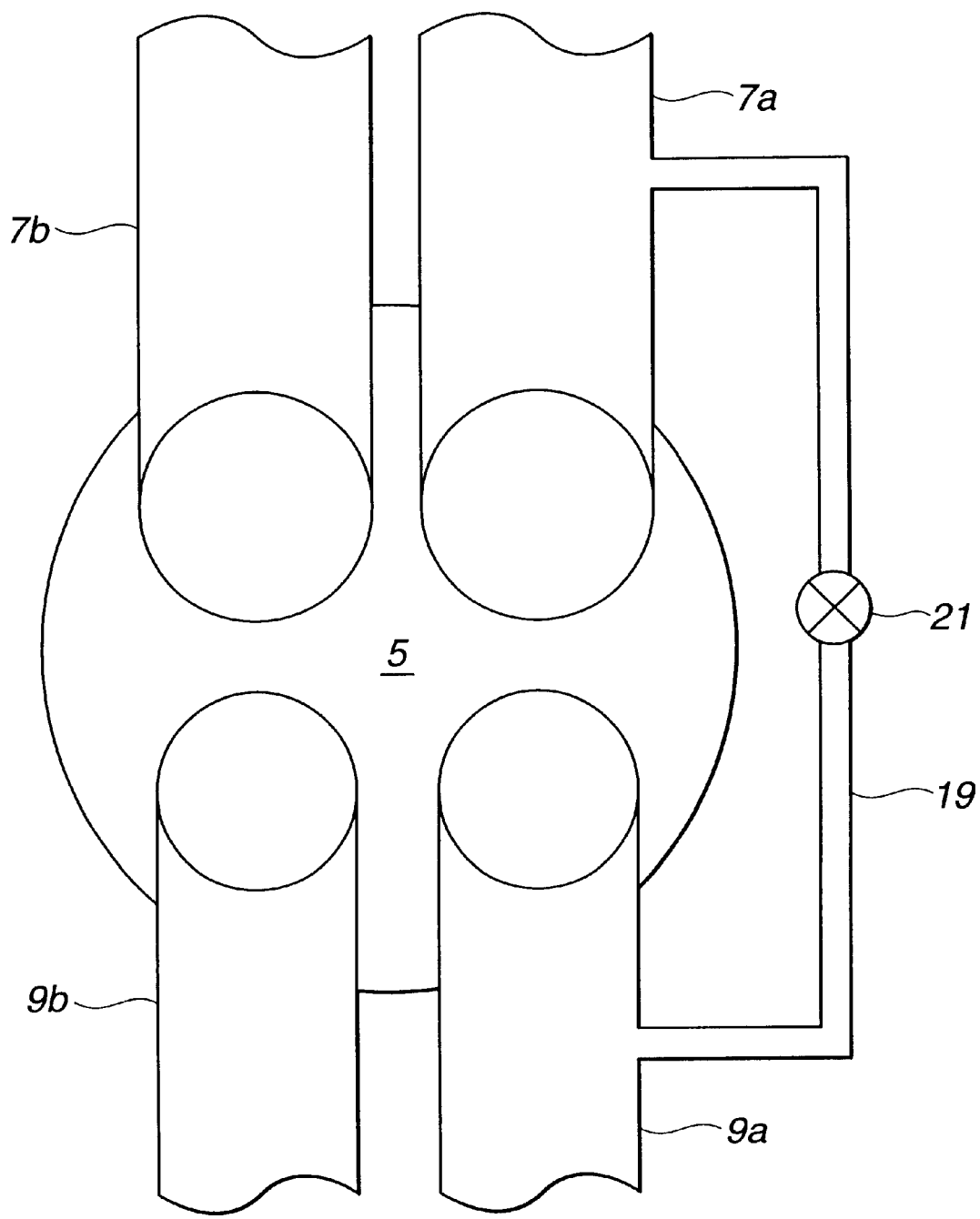
FIG. 2 is a top view schematically showing a cylinder, intake ports and exhaust ports of the engine according to the first embodiment.

First, with reference to FIGS. 1 to 9C, there will be discussed a compression self-ignition type internal combustion engine (gasoline engine) 1 according to a first embodiment of the present invention. FIG. 1 shows a construction of engine 1 according to the first embodiment. FIG. 2 shows a top view of a combustion chamber 5 of engine 1 according to the first embodiment. Engine 1 comprises a piston 3, combustion chamber 5, first and second intake ports 7a and 7b constituting an intake passage, first and second exhaust ports 9a and 9b constituting an exhaust passage, a pair of intake valves 11 adapted to respectively close intake ports 7a and 7b, and a pair of exhaust valves 13 adapted to respectively close exhaust ports 9a and 9b, by each cylinder. A fuel injector 15 for injecting gasoline (fuel) into combustion chamber 5 is provided at an upper and center portion of combustion chamber 5. An ignition plug 17 operating during a spark-ignition combustion is provided at a portion near fuel injector 15. First intake port 7a and first exhaust ports 9a are connected by an EGR (exhaust gas circulation) passage 19. An EGR control valve 21 is provided in EGR passage 19. EGR valve 21, fuel injector 15 and ignition plug 17 operate according to control signals outputted from an ECU (electronic controlling unit) 23.

Figure 3:
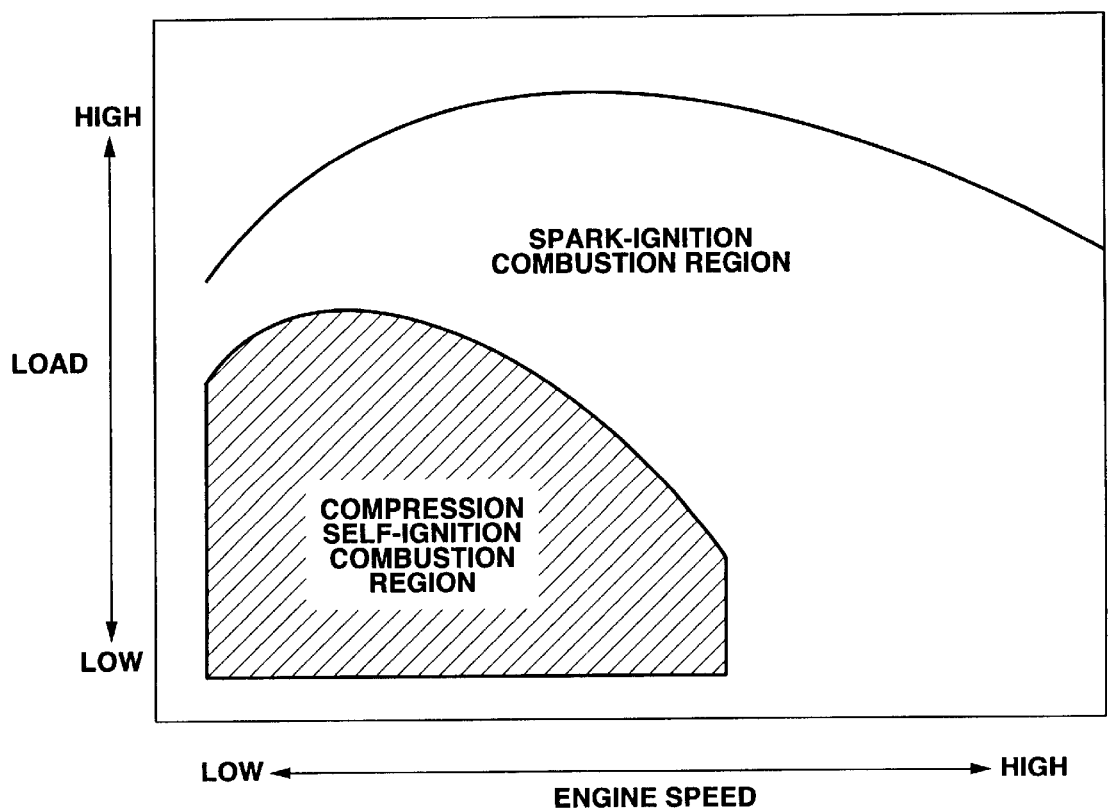
FIG. 3 is a graph showing a relationship among a combustion pattern, an engine speed and an engine load of the engine according to the first embodiment.

ECU 23 comprises a combustion pattern deciding section 29, a spark-ignition combustion control section 33, an EGR control section 35 and a fuel injection timing control section 37, in the form of programs for a microcomputer of ECU 23. Combustion pattern deciding section 29 decides a combustion pattern to execute a compression self-ignition combustion when engine 1 operates in an intermediate-load region and an intermediate or low engine speed region, and to execute the spark-ignition combustion when engine 1 operates in a high-load or high engine speed region, as shown in FIG. 3. Spark-ignition combustion control section 31 executes the spark-ignition combustion by controlling fuel injector 15 and spark plug 17 when combustion pattern deciding section 29 decides to execute the spark-ignition combustion. Self-ignition combustion control section 33 executes the self-ignition combustion by controlling EGR control section 35 and fuel injection timing control section 37 when combustion pattern deciding section 29 decides to execute the self-ignition combustion. EGR control section 35 varies a flow rate of EGR from exhaust passage to intake passage by controlling EGR control valve 21. Fuel injection timing control section 37 varies the fuel injection timing by controlling fuel injector 15.

Figure 4:
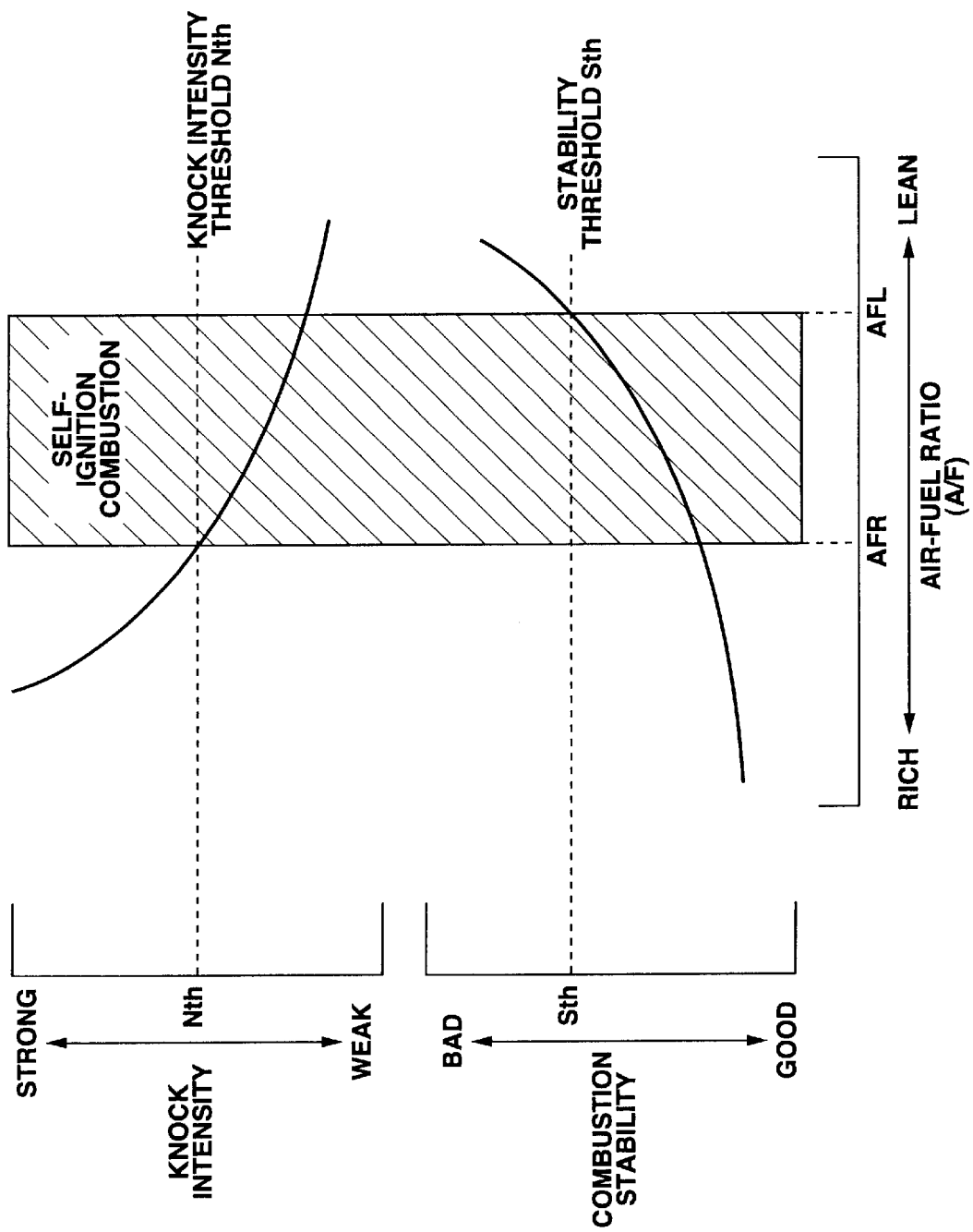
FIG. 4 is a graph showing a self-ignition combustion established region with respect to an air-fuel ratio.

FIG. 4 shows a self-ignition combustion region, where the self-ignition combustion can be executed, with respect to air-fuel ratio (A/F ratio). The self-ignition combustion region is shown by hatchings. By varying the air-fuel ratio toward a lean side, combustion stability is degraded, and the torque fluctuation of engine 1 increases. Therefore, the stability limit, which is defined as a tolerance upon taking account of the design point of engine 1 and the characteristic of a vehicle equipped with the engine 1, is a stability threshold Sth where the air-fuel ratio becomes a lean limit AFL. On the other hand, by varying the air-fuel ratio toward a rich side, the knock intensity increases. Accordingly, the air-fuel ratio at a knock threshold Nth becomes a rich limit AFR. Therefore, the air-fuel ratio range defined by combustion stability limit AFL and knock stability limit AFR corresponds to the self-ignition combustion region. As discussed above, the self-ignition combustion can be executed within this limited A/F ratio range.

Although the A/F ratio has been employed as an index for showing a ratio of gas (air) and fuel in the above-explanation, similar tendency is ensured in the case that the gases include combustion gas such as combustion residual gas and EGR gas. Under such a condition, a horizontal axis in FIG. 4 denotes G/F ratio in which G denotes the sum of a quantity of fresh air and a quantity of combustion gas, and F is the quantity of fuel.

Figure 5A:
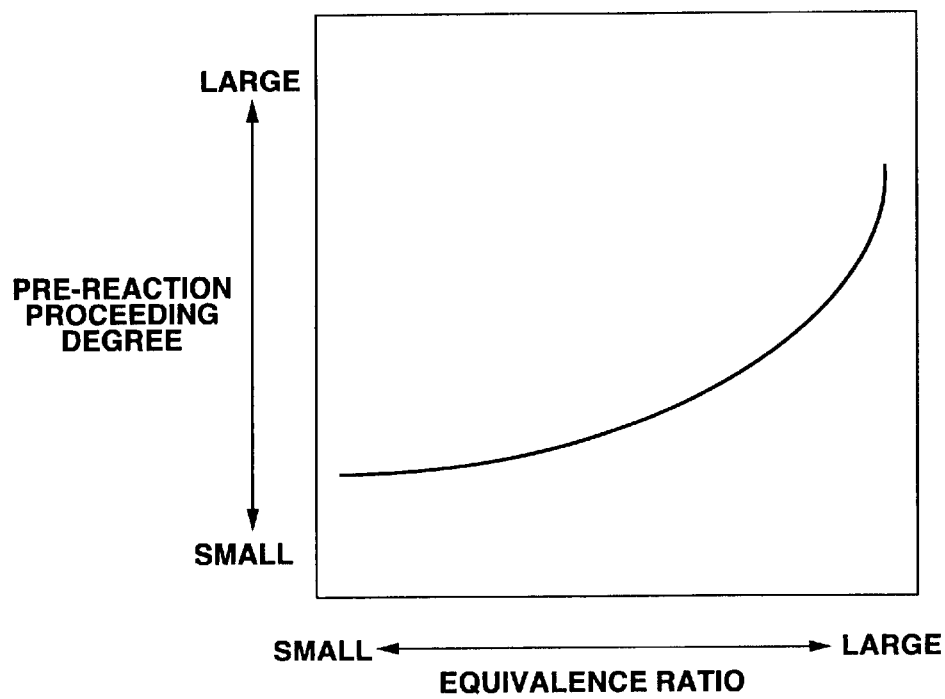
FIG. 5A is a graph showing a relationship between an equivalence ratio and a pre-reaction proceeding degree.
Figure 5B:
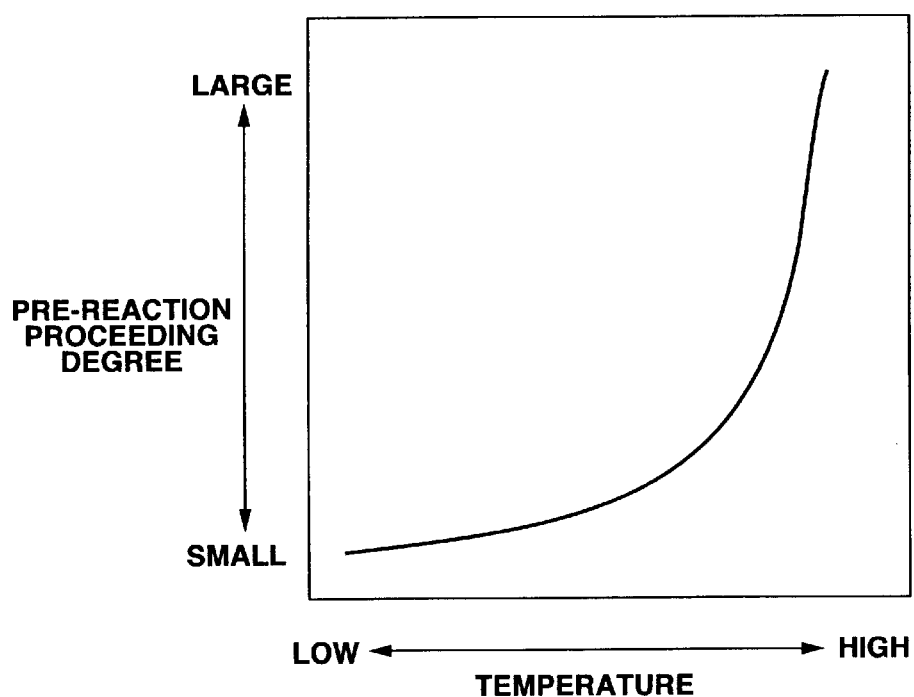
FIG. 5B is a graph showing a relationship between a temperature and the pre-reaction proceeding degree.

Self-ignition combustion is a low-temperature reaction. Therefore, a pre-reaction for generating an intermediate product is first executed, and thereafter a final oxidation reaction is executed to generate hot flame. Accordingly, by monitoring a proceeding degree of the pre-reaction, it is possible to estimate the possibility as to whether the self-ignition combustion can be generated. FIGS. 5A and 5B show a relationship between the proceeding degree of the pre-reaction and equivalence ratio (gas mixture density), and a relationship between the proceeding degree of the pre-reaction and temperature. As shown in FIG. 5A, larger the equivalence ratio becomes, larger the proceeding degree of the pre-reaction becomes gradually and slowly. On the other hand, as shown in FIG. 5B, higher the temperature becomes, larger the proceeding degree of the pre-reaction becomes radically. More specifically, the variation tendency of the proceeding degree of the pre-reaction with respect to the temperature is exponential. The sensibility of the proceeding degree of the pre-reaction with respect to the temperature is largely higher than that with respect to the equivalence ratio. Accordingly, it will be understood that the self-ignition combustion is effectively promoted by utilizing a high-temperature combustion gas. In this first embodiment, EGR gas, which is exhaust gas returned from the exhaust passage to the intake passage, is employed as combustion gas.

Figure 6:
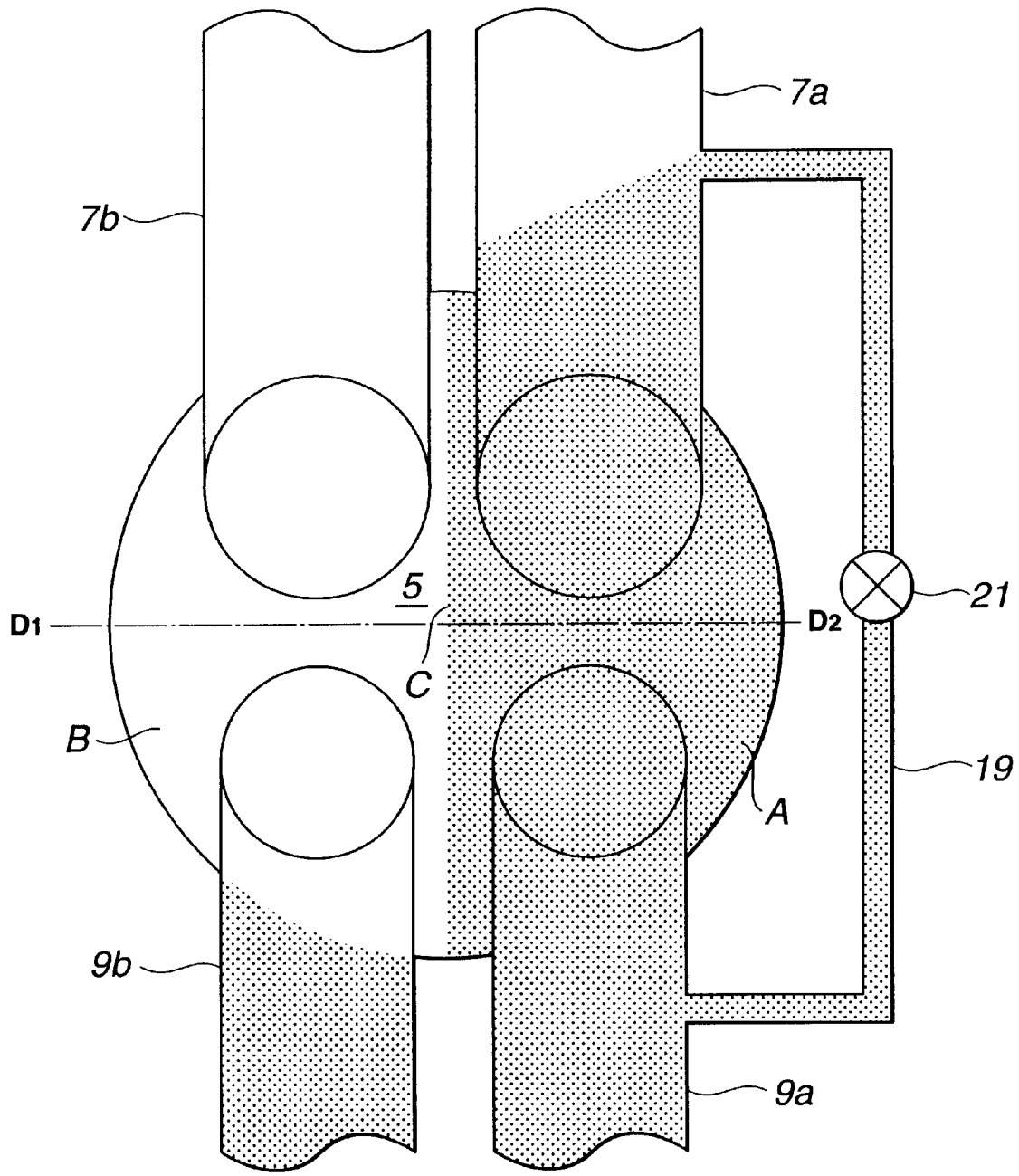
FIG. 6 is a top view showing a gas distribution in the combustion chamber generated in the first embodiment.

FIG. 6 shows a gas distributional condition in combustion chamber 5 of engine 1 after the intake stroke under a condition that exhaust gas is recirculated from first exhaust port 9a through EGR passage 19 to first intake port 7a. As shown in FIG. 6, EGR gas A together with fresh air are supplied from first intake port 7a to a right half in combustion chamber 5, and fresh air B is supplied from second intake port 7b to a left half of combustion chamber 5. That is, the EGR gas layer including EGR gas A and the air layer of fresh air B are stratified in combustion chamber 5. Fuel is injected from fuel injector 15 to a center C located between the EGR gas layer and the air layer. This stratification is further effectively realized by separately generating tumble flows as to the respective layers by means of a depressed portion formed at a top surface of piston 3. It is certain that the positions of the EGR layer and the air layer may be exchanged with each other.

Figure 7A:
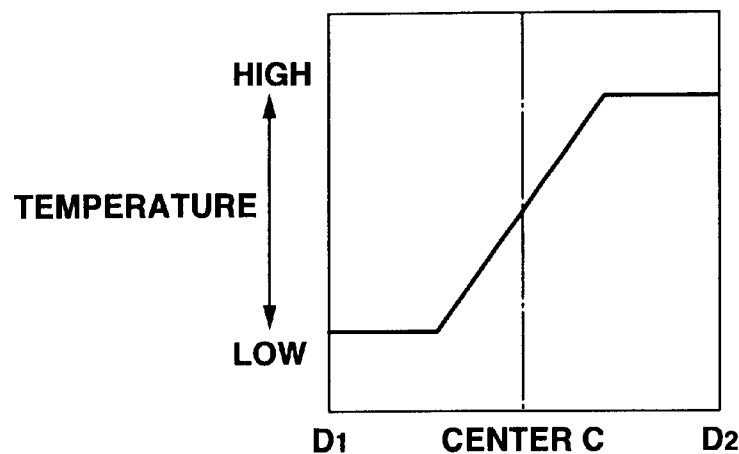
FIGS. 7A, 7B and 7C are graphs showing the temperature, the equivalence ratio and the pre-reaction proceeding degree, respectively, under a condition that fuel is injected to a boundary zone between EGR layer and air layer under the gas distribution shown in FIG. 6.
Figure 7B:
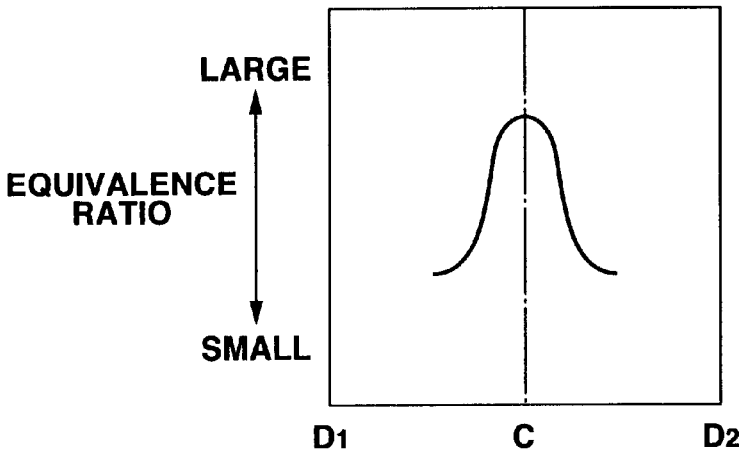
Figure 7C:
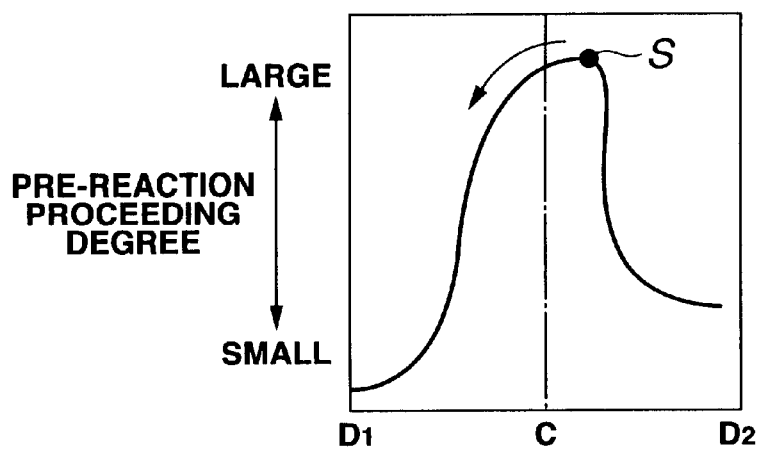

FIGS. 7A, 7B and 7C show a temperature distribution, an equivalence ratio distribution and a distribution of the pre-reaction proceeding degree in combustion chamber 5 of FIG. 6, respectively. In these Figures, a horizontal axis corresponds to the D1–D2 line including center C in FIG. 6. As shown in FIG. 7A, there is a region, where a gradient of the temperature is large, in the vicinity of center C. By injecting fuel to this center C, the equivalence ratio at the center portion becomes large.

The pre-reaction combustion proceeds from a region where fuel is rich and the temperature is high. Therefore, as shown in FIG. 7C, the pre-reaction combustion is started from an ignition point S where the pre-reaction proceeding degree is largest. Since there is the large temperature gradient in the vicinity of the ignition point S, the quantity of fuel to be first ignited is not so large and therefore the knocking is not generated thereby. Further, after the ignition, the self-ignition sequentially proceeds to low temperature regions according to the temperature gradient. Therefore, the combustion in this process is not violent and therefore the knocking is not generated. As a result, the enabling load region for executing the self-ignition combustion (self-ignition combustion region) is expanded toward a high-load side, and therefore, further stable self-ignition combustion is ensured in a further wider engine operating region.

Figure 8A:
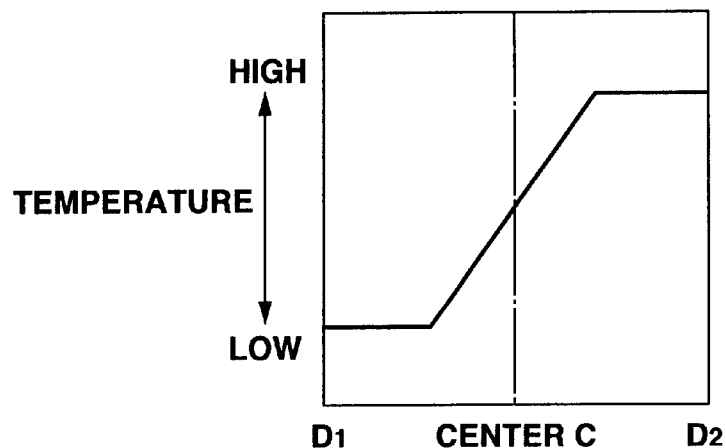
FIGS. 8A, 8B and 8C are graphs showing the temperature, the equivalence ratio and the pre-reaction proceeding degree, respectively, under a condition that fuel is injected to the EGR layer under the gas distribution shown in FIG. 6.
Figure 8B:
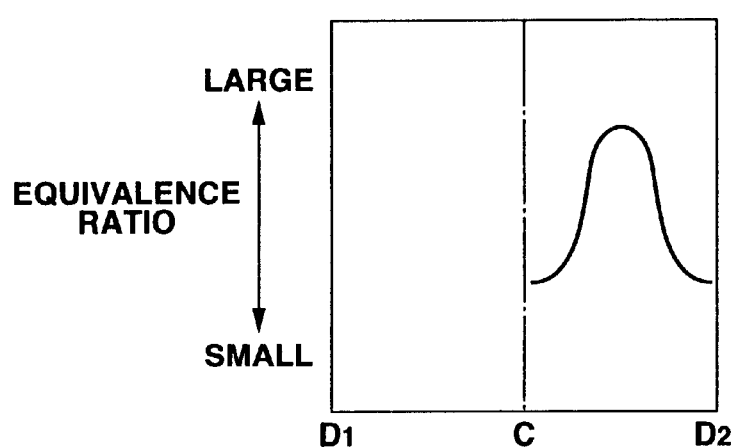
Figure 8C:
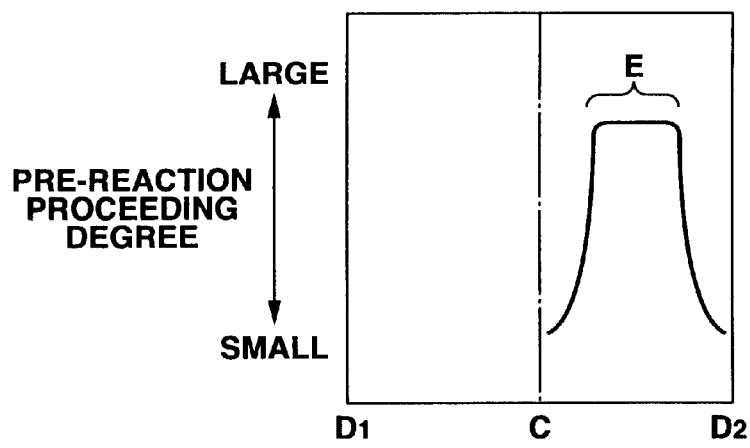

In contrast, FIGS. 8A, 8B and 8C show a temperature distribution, an equivalence ratio distribution and a distribution of the pre-reaction proceeding degree in a combustion chamber of a conventional engine system, respectively. This conventional engine system corresponds to a case in that fuel is injected to the EGR layer. Accordingly, the pre-reaction violently proceeds due to the fuel in the EGR layer of high temperature. Therefore, if this combustion pattern is applied to the self-ignition combustion of gasoline, a fuel-rich region in the high-temperature EGR layer shown in FIG. 8B generates the self-ignition at the first rush as shown by E in FIG. 8C. Consequently, the radical (violent) combustion occurs and therefore the knocking is invited.

Figure 9A:
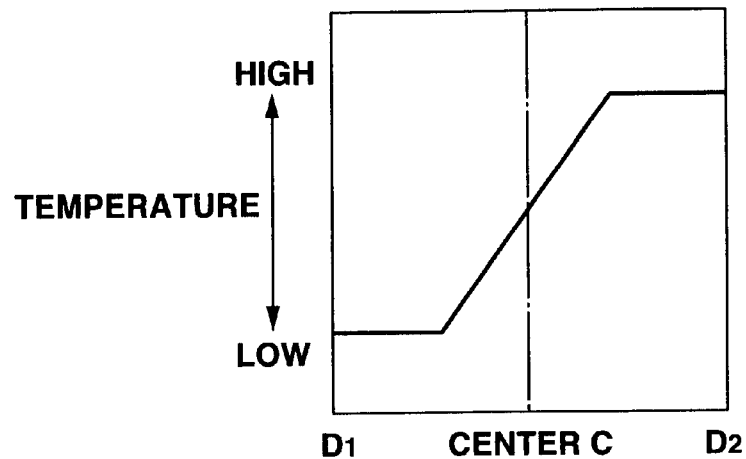
FIGS. 9A, 9B and 9C are graphs showing the temperature, the equivalence ratio and the pre-reaction proceeding degree, respectively, under a condition that fuel is injected to the air layer under the gas distribution shown in FIG. 6.
Figure 9B:
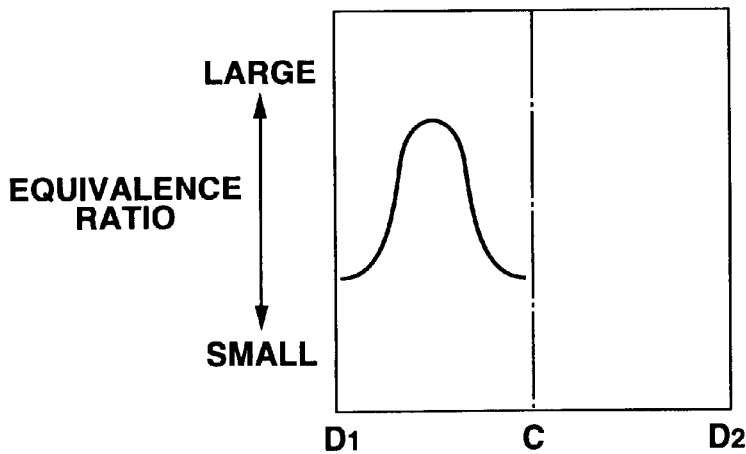
Figure 9C:
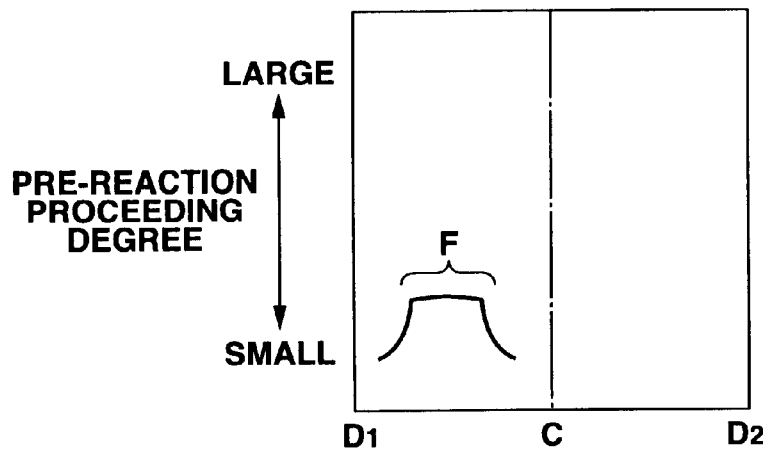

Further, FIGS. 9A, 9B and 9C show a temperature distribution, an equivalence ratio distribution and a distribution of the pre-reaction proceeding in a combustion chamber of another conventional engine system, respectively. This conventional engine system corresponds to a case in that fuel is injected to the intake-air layer. Accordingly, the pre-reaction does not proceed due to the lower temperature of the intake-air layer. Therefore, if this combustion pattern is applied to the self-ignition combustion of gasoline, a fuel-rich region in the low-temperature intake-air layer shown in FIG. 9B does not generate the self-ignition as shown by F in FIG. 9C. Consequently, engine 1 is misfired.

Figure 10:
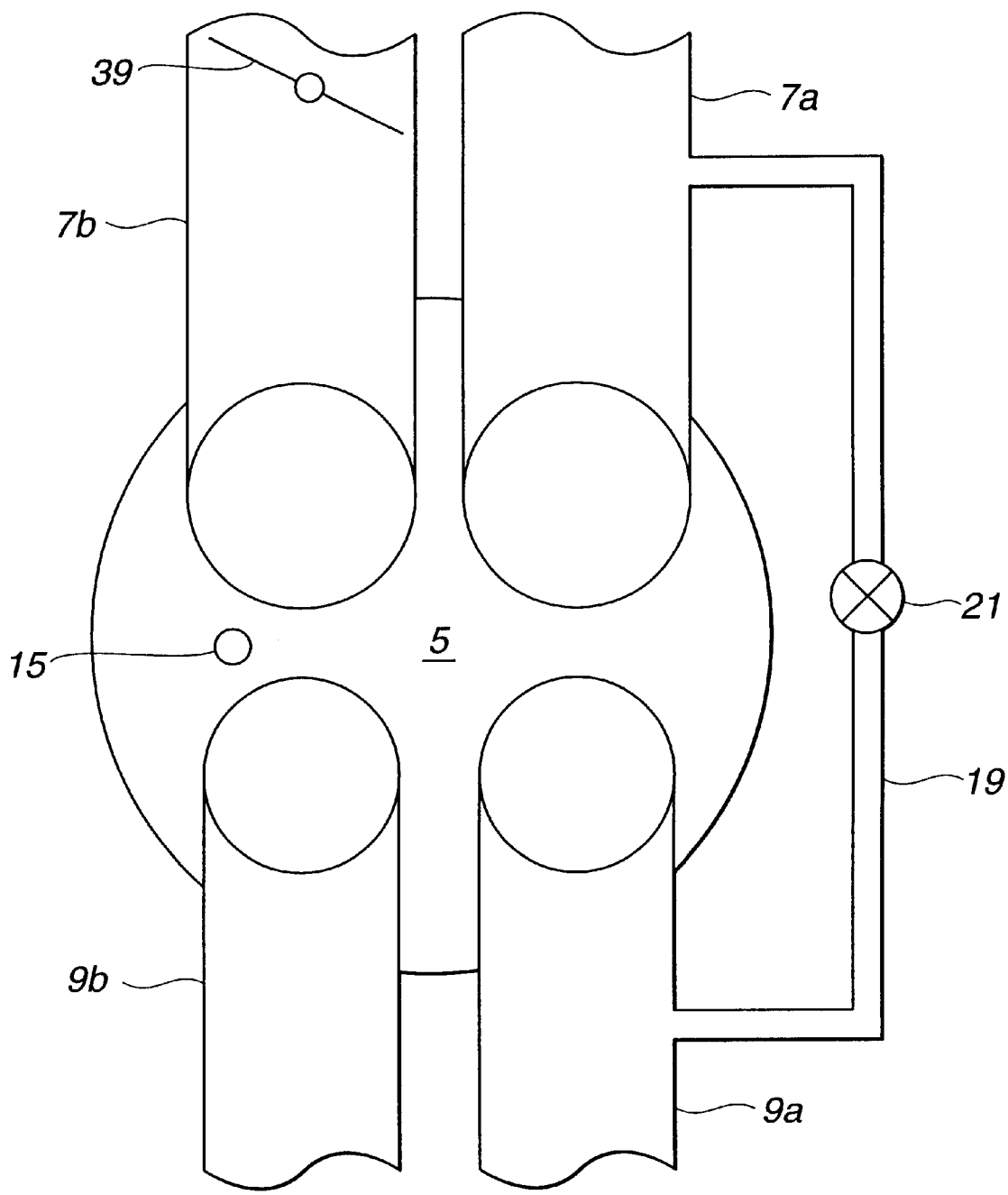
FIG. 10 is a top view schematically showing a cylinder, intake ports and exhaust ports of the engine according to a second embodiment of the present invention.

With reference to FIGS. 10 to 16, there will be discussed the engine 1 according to a second embodiment of the present invention. FIG. 10 shows a top view of engine 1 according to a second embodiment of the present invention, corresponding to FIG. 2. The second embodiment is characteristically arranged to further comprise an intake-air quantity control valve 39 in second intake port 7b and to locate fuel injector 15 at a position between second intake port 7b and second exhaust port 9b, in addition to the construction of the first embodiment. ECU 23 outputs a control signal to intake-air quantity control valve 39 to control the intake-air quantity according to the engine operating condition. This arrangement enables varying a ratio between the EGR layer and the air layer according to an engine operating condition.

Figure 11A:
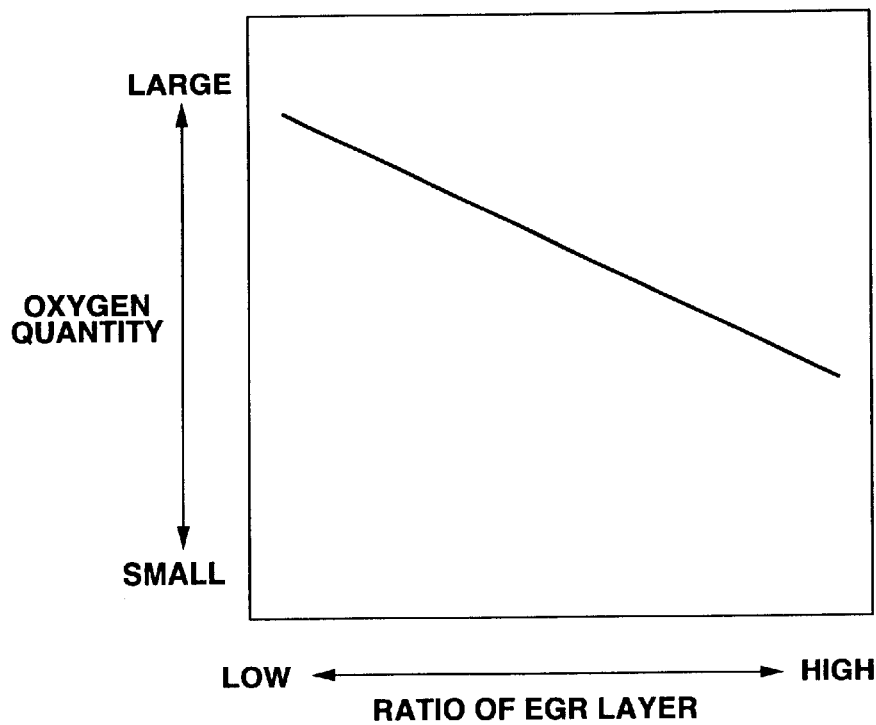
FIG. 11A is a graph showing a relationship between the ratio of the EGR layer and an oxygen quantity.
Figure 11B:
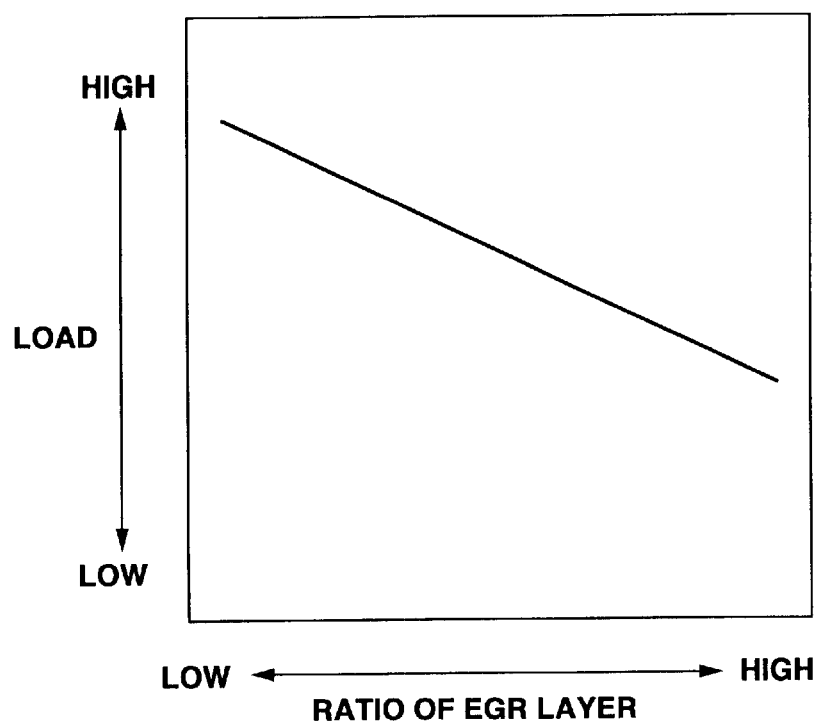
FIG. 11B is a graph showing a relationship between the ratio of the EGR layer and an engine load.

FIGS. 11A and 11B show a relationship between the oxygen quantity and the ratio of the EGR layer and a relationship between the engine load and the ratio of the EGR layer, respectively. Since the ratio of the air layer decreases according to the increase of the ratio of the EGR layer, the oxygen quantity in combustion chamber 5 decreases as shown in FIG. 11A. As a result, the fuel-injection quantity to combustion chamber 5 decreases, and therefore the load of engine 1 also decreases according to the increase of the ratio of the EGR layer as shown in FIG. 11B. Accordingly, in a case that it is important to stably execute the ignition of the fuel, it is preferable to set the ratio of the EGR layer at the high ratio under the low load condition where the fuel consumption is small. Consequently, it is necessary to vary the ratio between the EGR layer and the air layer according to the engine load.

Figure 12:
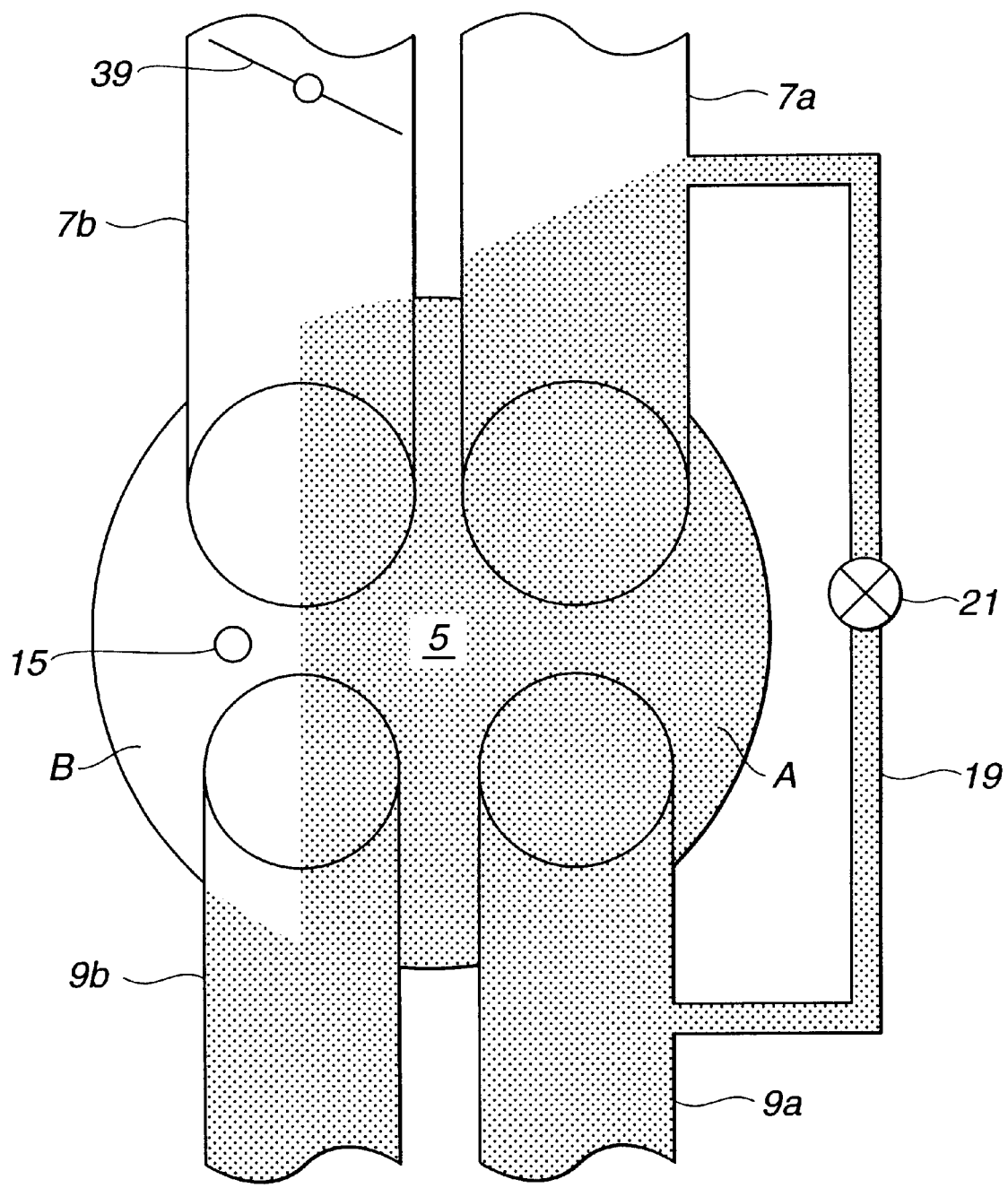
FIG. 12 is a top view showing a gas distribution in the combustion chamber under a low load condition in the second embodiment.

FIG. 12 shows a gas distributional condition in combustion chamber 5 when the engine 1 operates under a low load condition. By setting intake-air control valve 39 at almost closed condition to be adapt to the low load condition, the quantity of fresh air B supplied from second intake port 7b is decreased, and therefore the quantity of EGR gas A supplied from first intake port 7a is increased. Consequently, the ratio of the EGR layer increases as compared with the ratio in the case of FIG. 6.

Figure 13:
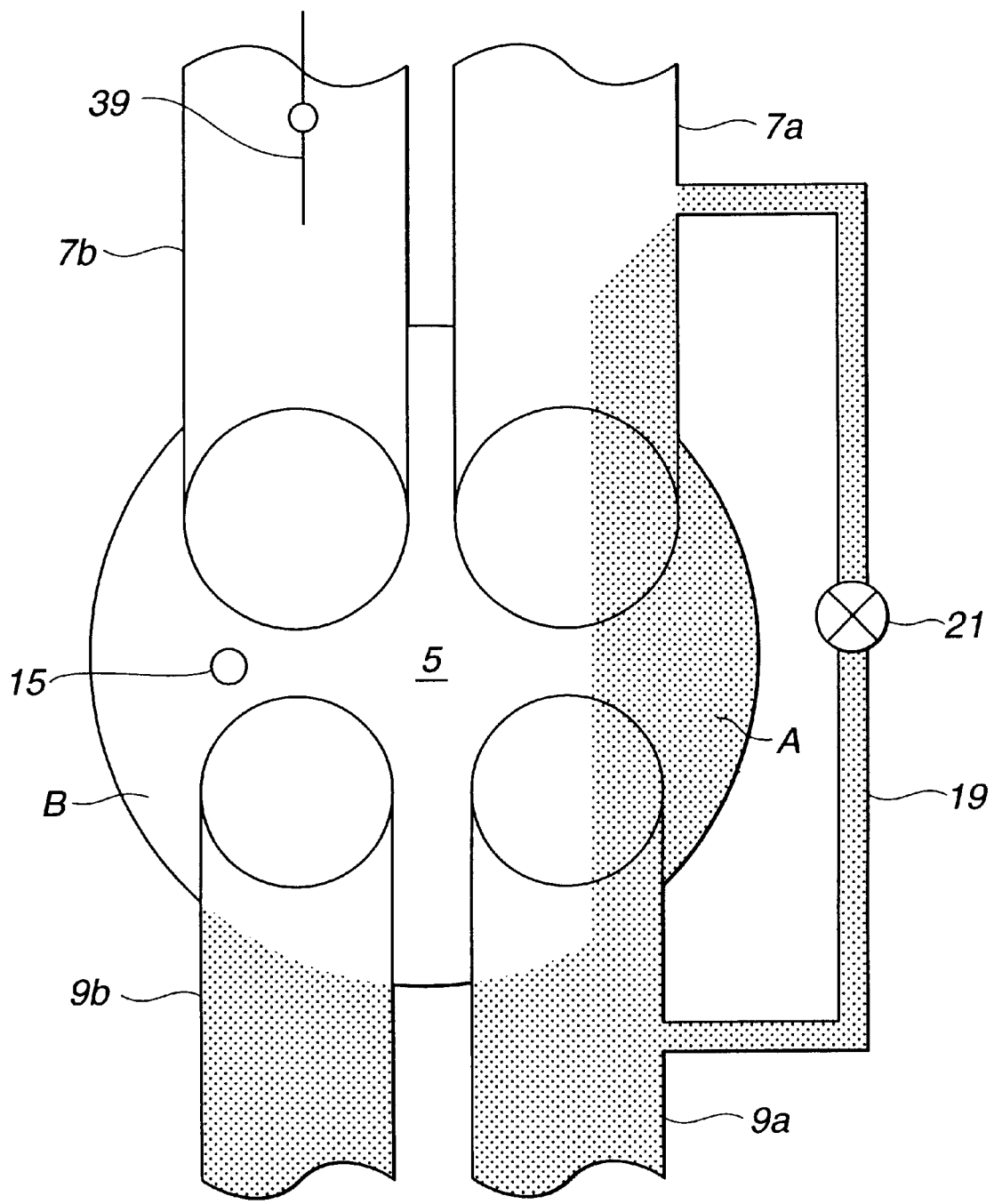
FIG. 13 is a top view showing a gas distribution in the combustion chamber generated under a high load condition in the second embodiment.

FIG. 13 shows a gas distributional condition in combustion chamber 5 when the engine 1 operates under a high load condition. By setting intake-air control valve 39 at a full open condition and by decreasing the opening of EGR control valve 21, the ratio of the EGR layer is decreased.

Figure 14:
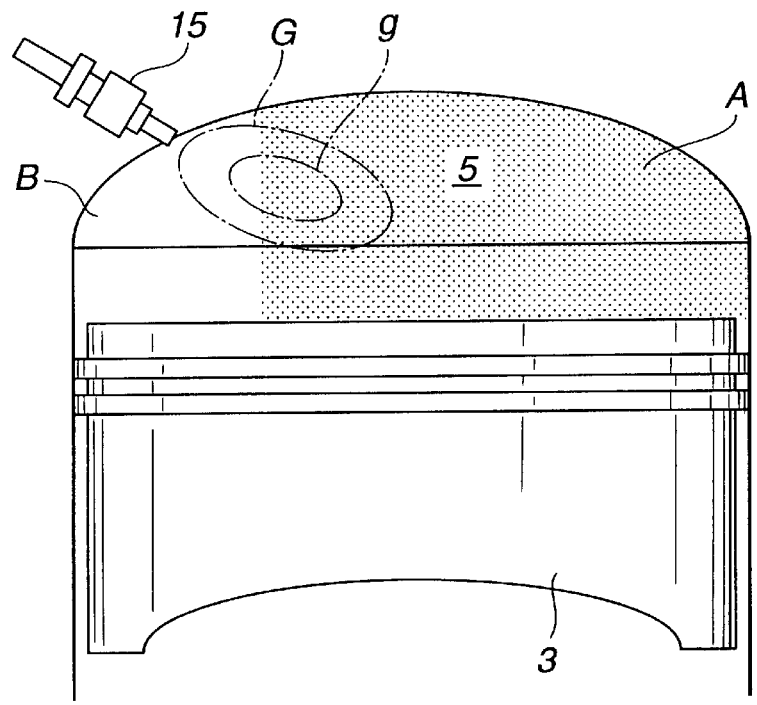
FIG. 14 is a side cross-sectional view showing the gas distribution of FIG. 12 and a fuel distribution thereto.
Figure 15:
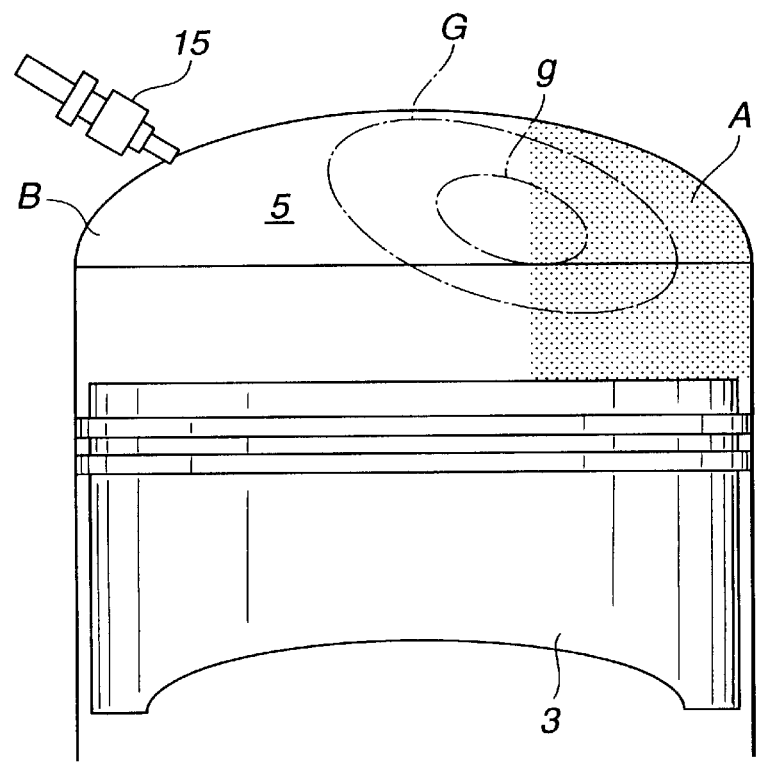
FIG. 15 is a side cross-sectional view showing the gas distribution of FIG. 13 and a fuel distribution thereto.

FIG. 14 shows the fuel distribution G of the fuel injected by fuel injection 15 into combustion chamber 5 under the low-load gas distributional condition shown in FIG. 12. FIG. 15 shows the fuel distribution G of the fuel injected by fuel injection into combustion chamber 5 under the high-load gas distributional condition shown in FIG. 13. In both cases, the fuel distribution G ranges to the boundary zone between the EGR layer and the air layer, as clearly shown in FIGS. 14 and 15. This combination of the fuel injection arrangement and the varying operation of the ratio between the EGR layer and the air layer enables the sequential self-ignition by utilizing the temperature gradient, as is similar to that in the first embodiment. That is, the self-ignition combustion is smoothly executed by this combination manner without generating the knocking. In FIGS. 14 and 15, a region g in the fuel injected region G is a center portion where the fuel ratio is rich, and a region around the region g in the region G is put in the slightly rich condition.

The fuel ignition timing of fuel injector 15 is varied to properly inject the fuel G to the boundary zone between the EGR layer and the air layer as shown in FIGS. 14 and 15. Under the low-load condition, the fuel injection is executed at the timing when piston 3 reaches in the vicinity of TDC in a second half of the compression stroke. When piston 3 is positioned in the vicinity of TDC, the back pressure is high, and therefore the expanding force of the injected fuel is suppressed. Accordingly, the fuel distribution region is compactly produced in the vicinity of fuel injector 15 as shown in FIG. 14. This compact fuel-distribution region effectively operates to promote the ignition under the low-load condition where the fuel injection quantity is small.

On the other hand, under the high-load condition, the fuel injection is executed at an earlier timing as compared with the timing of the low-load condition. When the fuel is injected at the earlier timing, the back pressure is small as compared with that at the timing near TDC, and therefore the expanding force of the injected fuel becomes large. Accordingly, the fuel distribution region is produced at an area apart from fuel injector 15 as shown in FIG. 15. Under the high-load condition where the fuel injection quantity is large, the earlier fuel injection effectively functions to promote the dispersion of the fuel in the combustion chamber 5.

Figure 16:
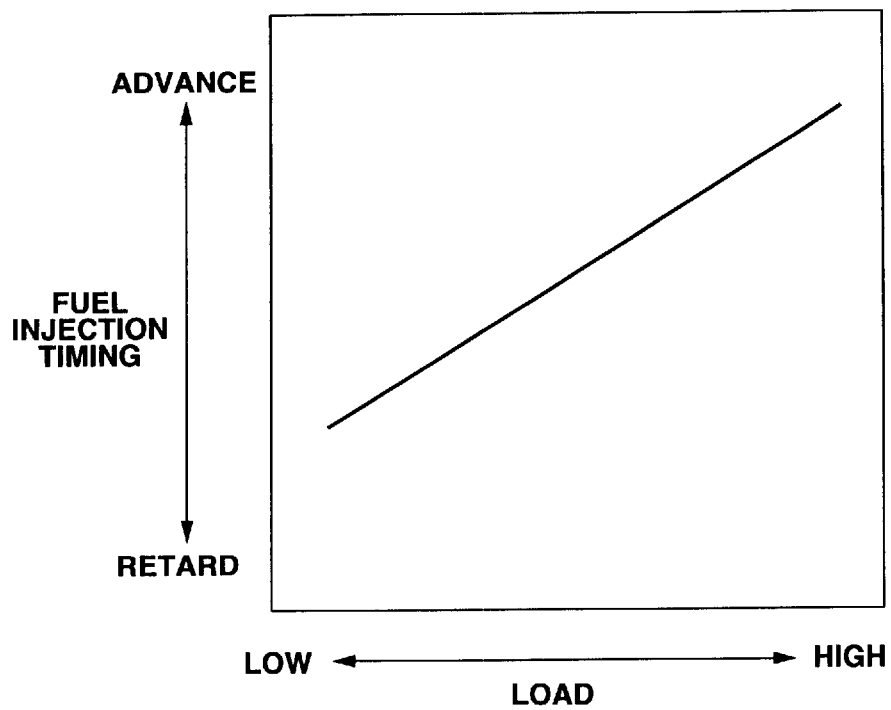
FIG. 16 is a graph showing a relationship between the engine load and a fuel injection timing of the second embodiment.

FIG. 16 shows a relationship between the fuel injection timing and the engine load which relationship is employed in the second embodiment according to the present invention. Higher the engine load becomes, more advanced the fuel injection timing becomes. By varying the fuel injection timing according to the ratio between the EGR layer and the air layer according to the engine load condition, it becomes possible to inject the fuel to the boundary zone between the EGR layer and the air layer. This enables the compression self-ignition combustion to be generated under a wider engine operating condition.

With reference to FIGS. 17 to 20, there will be discussed the engine 1 according to a third embodiment of the present invention. The third embodiment is generally similar to the second embodiment shown in FIG. 10 except that the EGR layer and the air layer are varied according to the engine speed. In this third embodiment, the fuel injection timing is varied so that the fuel is injected to the boundary zone between the EGR layer and the air layer as is similar to the second embodiment.

Figure 17:
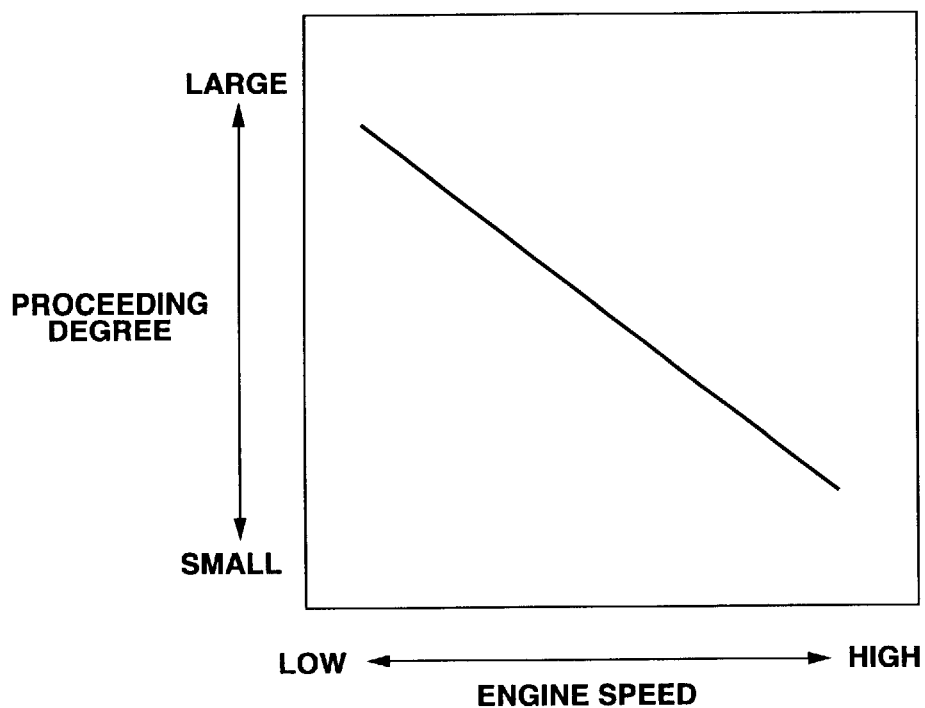
FIG. 17 is a graph showing a relationship between the engine speed and the pre-reaction proceeding degree of a third embodiment.

FIG. 17 shows a relationship between the pre-reaction proceeding degree and the engine speed under the specific crank angle condition. Higher the engine speed becomes, smaller the actual time for advancing the pre-reaction becomes. Therefore, the pre-reaction proceeding degree is lowered according to the increase of the engine speed. This means that the ignitability of the fuel degrades according to the increase of the engine speed. Consequently, it is preferable to increase the ratio of the EGR layer when the engine 1 operates under the high engine speed condition, in order to promote the ignitability.

With this arrangement, by varying the ratio between the EGR layer and the air layer according to the engine speed and by varying the fuel injection timing according to the engine speed, it becomes possible to inject the fuel to the boundary zone between the EGR layer and the air layer even if the engine speed is varied. This enables the compression self-ignition combustion to be generated even if the engine speed is varied.

Figure 18:
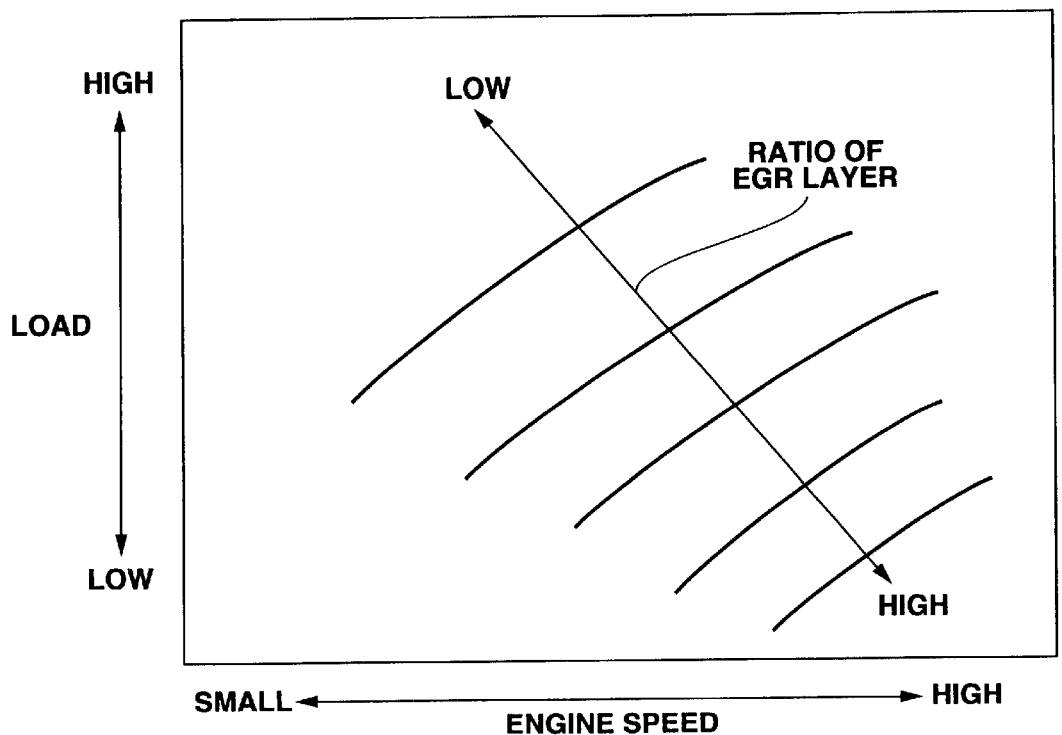
FIG. 18 is a graph showing a relationship among the engine speed, the engine load and the EGR layer ratio.
Figure 19:
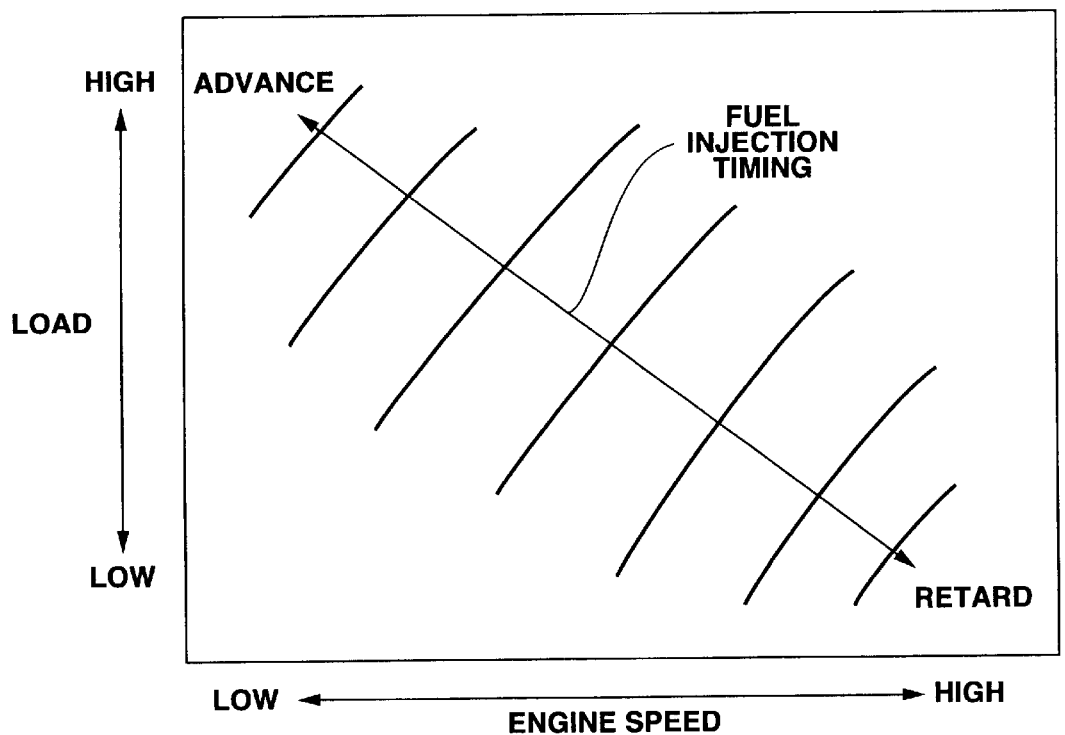
FIG. 19 is a graph showing a relationship among the engine speed, the engine load and the fuel injection timing.

FIG. 18 shows a relationship among the ratio between the EGR layer and the air layer, the engine load and the engine speed, employed in the control of engine 1. As is clear from FIG. 18, the ratio of the EGR layer is increased according to the increase of the engine speed when engine 1 operates under the low-load condition. FIG. 19 shows a relationship among the fuel injection timing, the engine load and the engine speed. As is clear from FIG. 19, the fuel injection timing is retarded according to the increase of the engine speed under the low load condition. That is, by increasing the ratio of the EGR layer, the boundary zone between the EGR layer and the air layer approaches a position of fuel injector 15.

Figure 20:
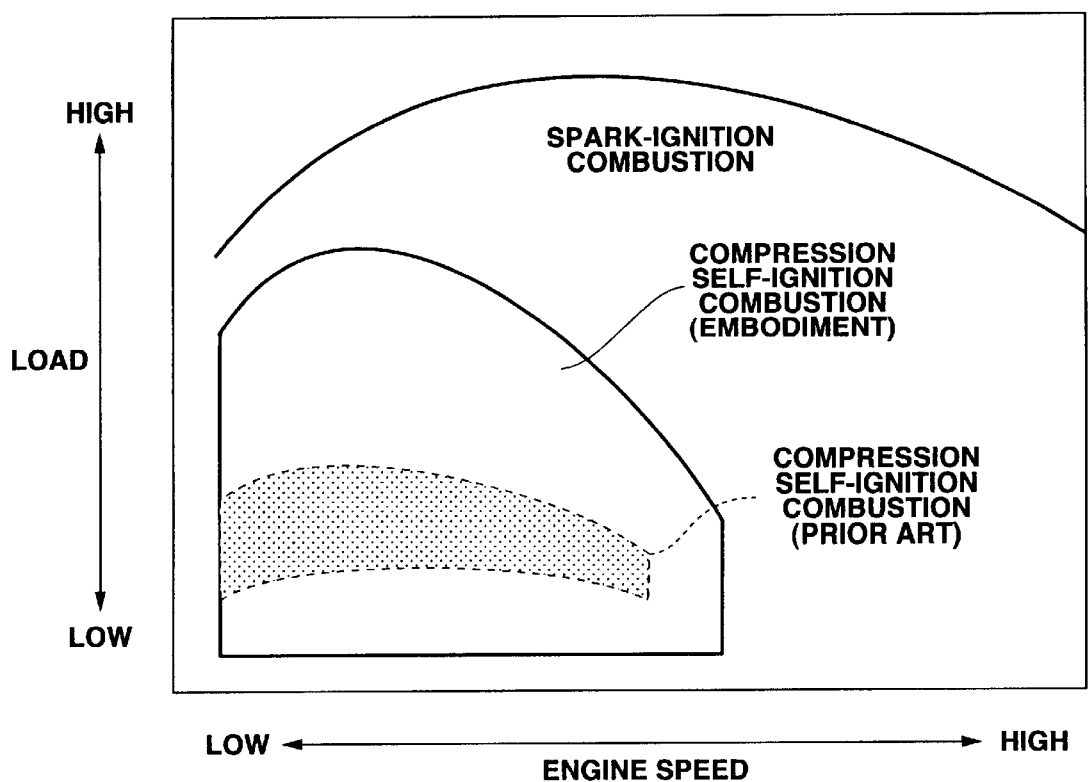
FIG. 20 is a graph showing a compression self-ignition combustion region according to the third embodiment and the compression self-ignition combustion region ensured by a conventional art.

FIG. 20 shows a map of the compression self-ignition combustion. A region surrounded by a continuous line shows the compression self-ignition combustion region according to the present invention. In this region, it is arranged such that the ratio of the EGR layer is increased according to the increase of the engine speed under the low load condition. Another region surrounded by a broken line shows a conventional compression self-ignition combustion region. As is clear from FIG. 20, the compression self-ignition combustion region according to the present invention is largely wider than that according to the conventional art. More specifically, the compression self-ignition combustion region according to the present invention is expanded to the lower engine load side and the higher engine load side and to the higher engine-speed side.

Figure 21:
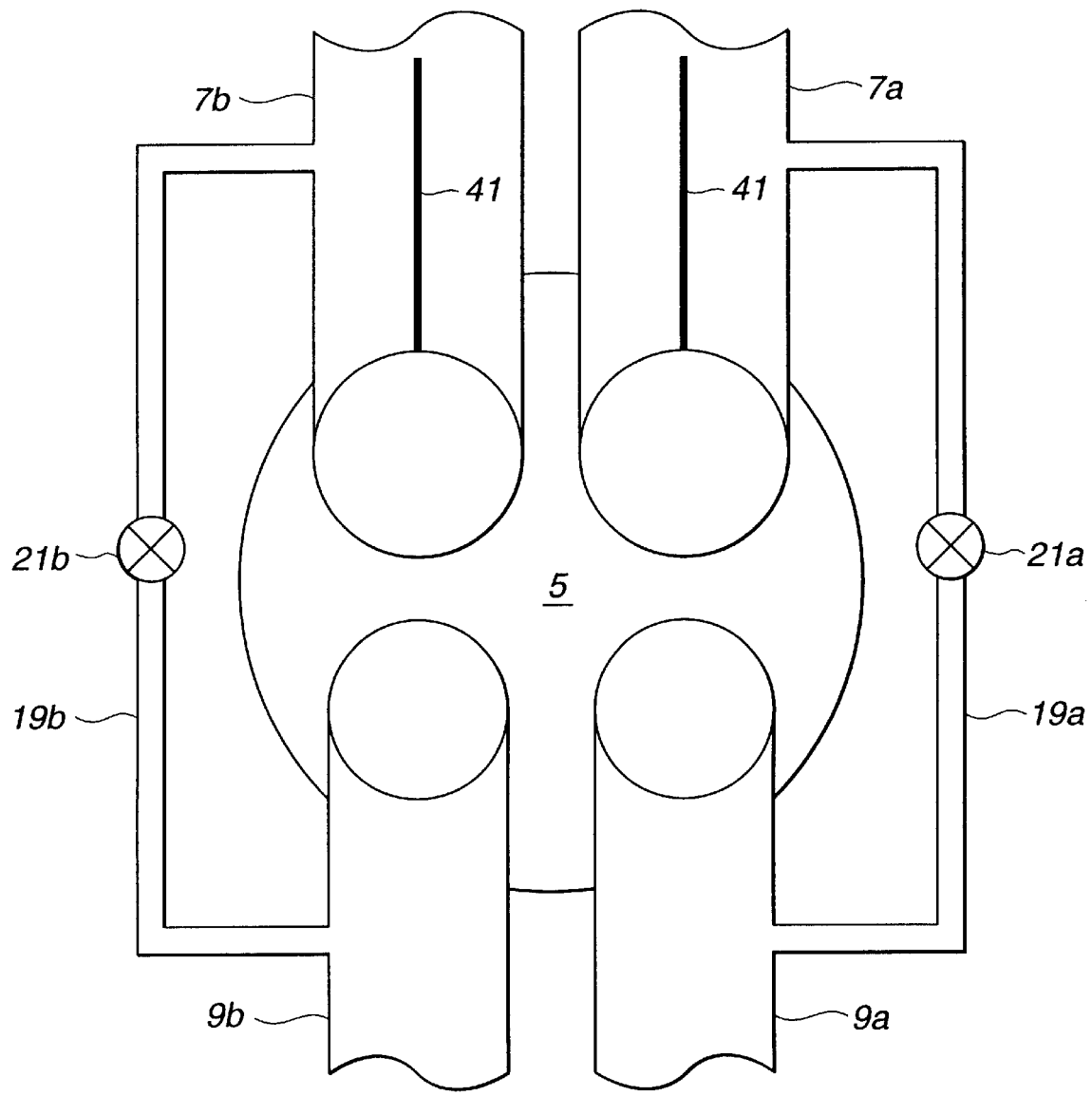
FIG. 21 is a top view schematically showing a cylinder, intake ports and exhaust ports of the engine according to a fourth embodiment of the present invention.
Figure 22:
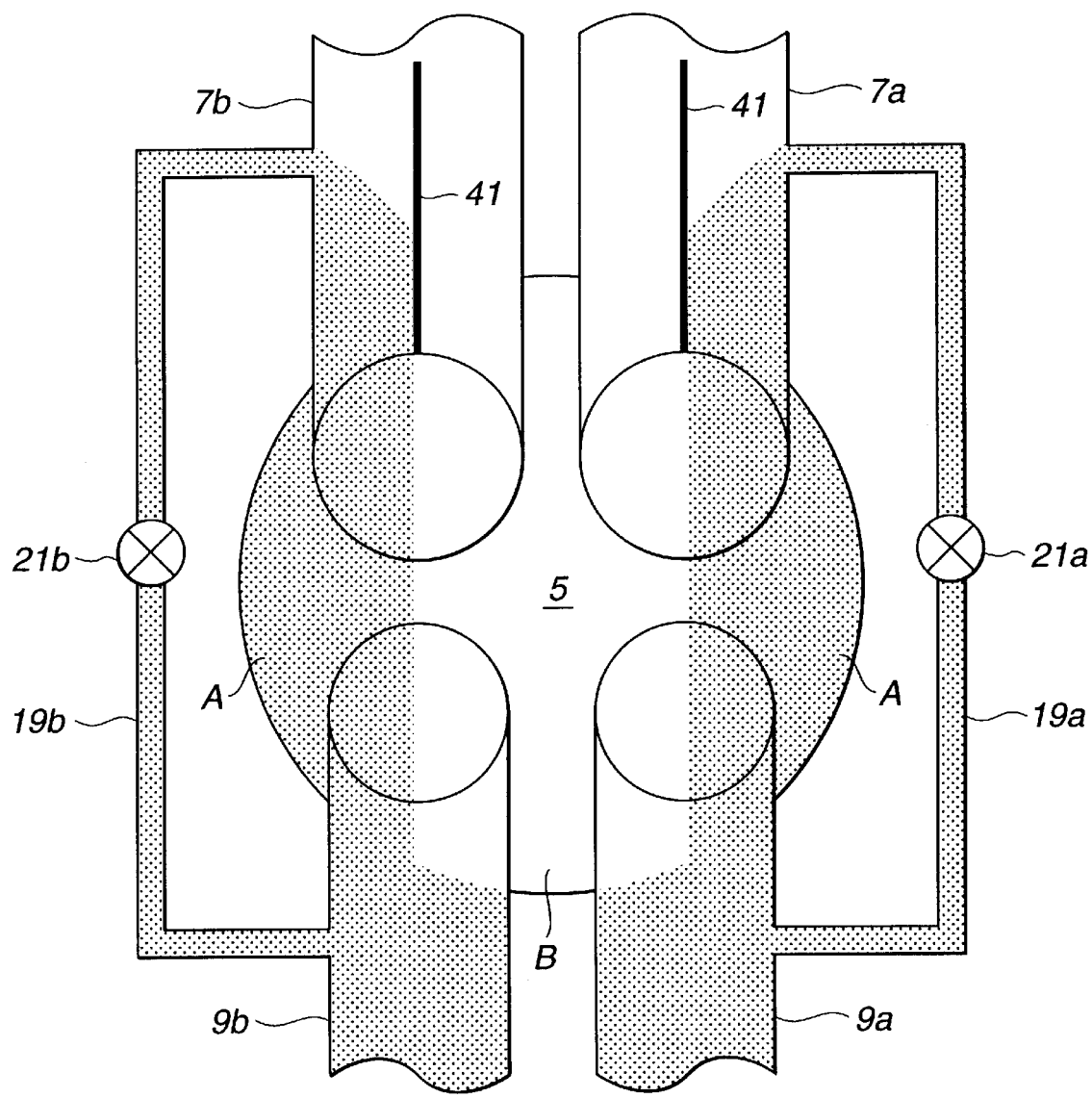
FIG. 22 is a top view showing a gas distribution in the combustion chamber according to the fourth embodiment.
Figure 23:
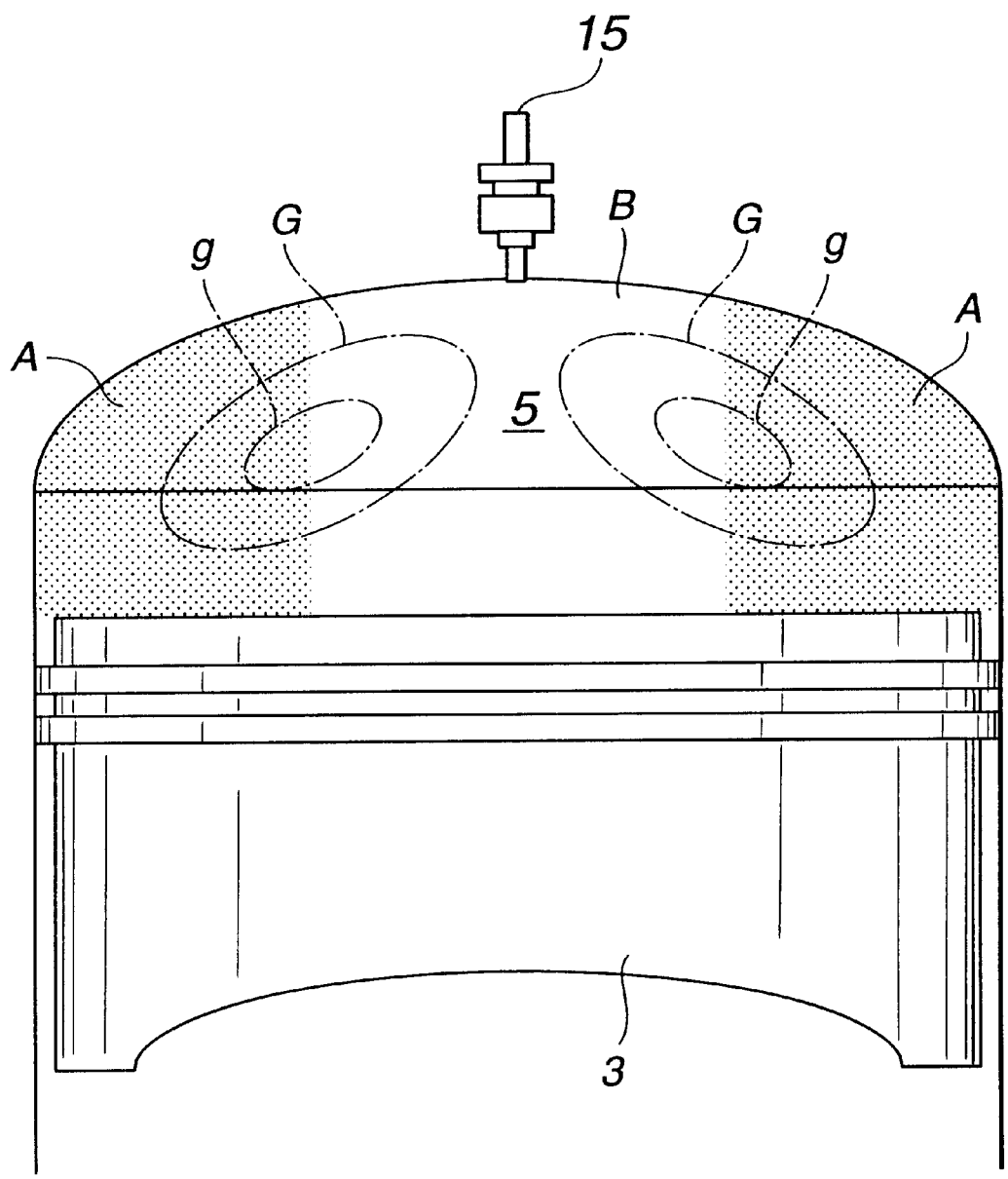
FIG. 23 is a side cross-sectional view showing the gas distribution of FIG. 22 and a fuel distribution thereto.

Referring to FIGS. 21 to 23, there is shown the engine 1 according to a fourth embodiment of the present invention. FIG. 21 shows a top of combustion chamber 5 of engine 1 according to according to the fourth embodiment view, corresponding to FIG. 2 of the first embodiment. The fourth embodiment is characteristically arranged to provide another EGR passage 19b connected to second intake port 7b and second exhaust port 9b, in addition to EGR passage 19a. First and second EGR control valves 21a and 21b are installed in first and second EGR passages 19a and 19b, respectively and is controlled by ECU 23. Further, a partition wall 41 is provided to each of intake ports 7a and 7b. Each partition wall 41 extends from an inlet of combustion chamber 5 to a slightly upstream side of a connecting port of EGR passage 19a, 19b in intake port 7a, 7b. Fuel injector 15 is disposed at the center and upper portion above combustion chamber 5 as is similar to that of the first embodiment. The other construction of the fourth embodiment is similar to that of the first embodiment shown in FIG. 1.

FIG. 22 shows a gas distributional condition in combustion chamber 5 according to the fourth embodiment. First EGR passage 19a recirculates EGR gas A to a right side of first intake port 7a having first partition wall 41a and therefore the EGR layer is produced at an right side area along and a cylinder wall. Similarly, second EGR passage 19b recirculates EGR gas A to a left side of second intake port 7b having second partition wall 41b and therefore the EGR layer is produced at a left side area along the cylinder wall, as shown in FIG. 22. Further, fresh air B is supplied to a center portion of combustion chamber 5 through a left side of first intake port 7a and a right side of second intake port 7b, and therefore the air layer is produced at a center portion of combustion chamber 5, as shown in FIG. 22. It will be understood that the locations of the EGR layer and the air layer may be exchanged with each other.

FIG. 23 shows a fuel distributional condition of fuel G injected from fuel injector 15 in the gas distributional condition shown in FIG. 22. Fuel injector 15 of this fourth embodiment is provided with two injection holes which are directed toward the right and left boundary zones. Accordingly, it becomes possible that fuel G is injected toward the both boundary zones simultaneously as shown in FIG. 23. This fuel injector 15 having two injection holes may be replaced with a normal diffusion type fuel injector.

Each boundary zone between the EGR layer and the air layer moves in the right and left directions of FIG. 22 when the ratio between the EGR layer and the air layer is varied by controlling EGR control valves 21a and 21b according to the engine operating condition. Therefore, the fuel injection regions are controlled by varying the fuel injection timing so that the fuel is injected toward each boundary zone between the EGR layer and the air layer.

Figure 24:
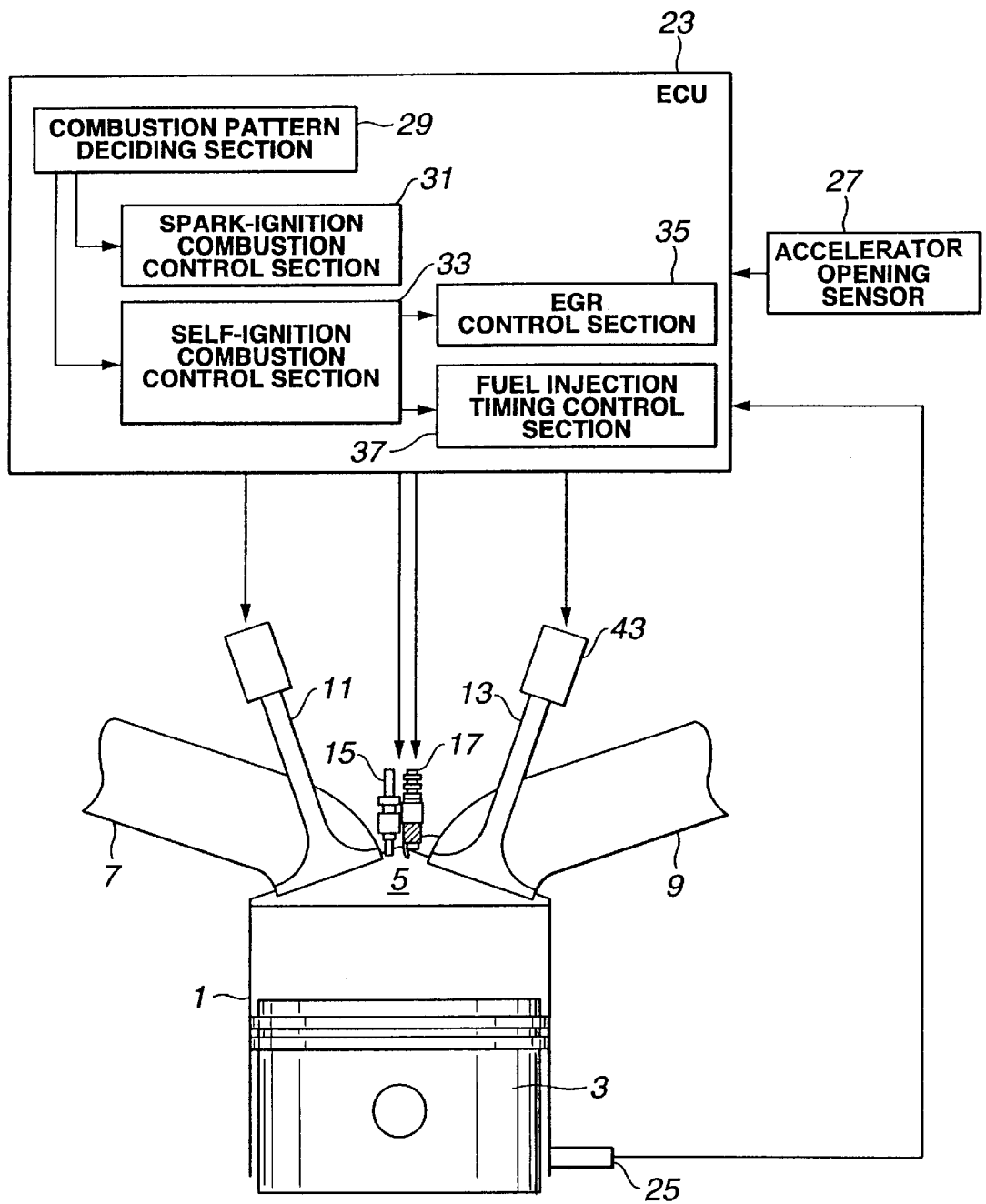
FIG. 24 is a schematic view showing a construction of a compression self-ignition type internal combustion engine according to a fifth embodiment of the present invention.

Referring to FIGS. 24 to 26B, there will be discussed a fifth embodiment according to the present invention. FIG. 24 shows a construction of a compression self-ignition type internal combustion engine 1 according to the fifth embodiment.

The fifth embodiment is arranged to have no EGR passage 19 and no EGR control valve 21. Further, each of intake valves 11 and exhaust valves 13 is operated by a variable valve timing mechanism 43. ECU 23 outputs a control signal to each variable valve timing mechanism 43 as shown in FIG. 24 to control the valve timing. Accordingly, the EGR layer and the air layer are produced in combustion chamber 5 by controlling the opening and closing timing of exhaust valve 13. It will be understood that variable valve timing mechanism 43 may be of an electromagnetic valve drive mechanism employing electromagnetic coils or a known mechanical valve drive mechanism. Fuel injector 15 is located at a position slightly offset from the center toward intake port 7.

Figure 25A:
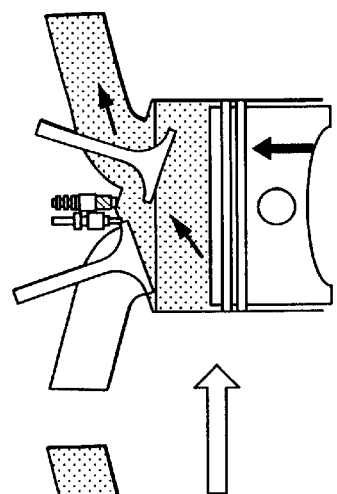
FIGS. 25A, 25B, 25C and 25D are process views showing an intake stroke, a compression stroke, an explosion stroke and an exhaust stroke of the fifth embodiment, respectively.
Figure 25B:
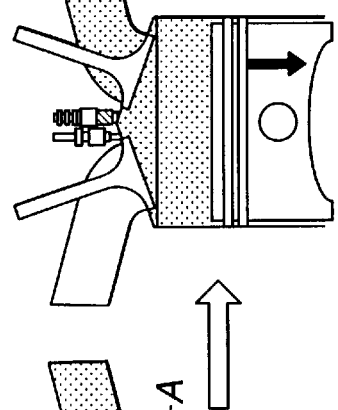
Figure 25C:
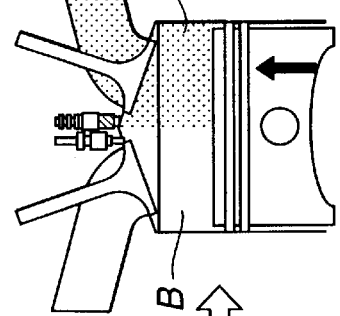
Figure 25D:
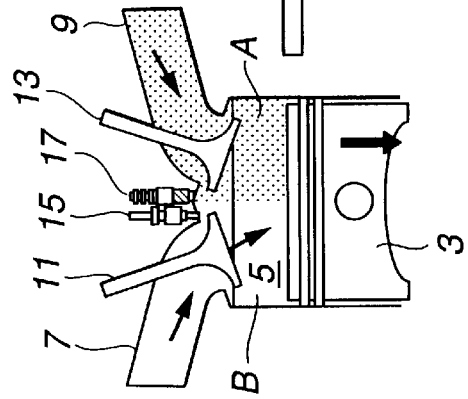

FIGS. 25A, 25B, 25C and 25D show gas distributional conditions for four strokes from intake stroke to exhaust stroke, respectively. FIG. 25A shows the gas distributional condition during the intake stroke where both intake valve 11 and exhaust valve 13 are opened. Therefore, fresh air is supplied from intake port 7 to combustion chamber 5, and exhaust gas is supplied from exhaust port 9 to combustion chamber 5. In combustion chamber 5 shown in FIG. 25A, the EGR layer is produced at a right half of combustion chamber 5 by EGR gas A supplied from exhaust port 9, and the air layer is produced at a left half of combustion chamber 5 by fresh air B supplied from intake port 7. At the timing when piston 3 is located near TDC during the compression stroke as shown in FIG. 25B, fuel is injected from fuel injector 15 toward the boundary zone between the EGR layer and the air layer, then the self-ignition is generated. Thereafter, the combustion cycle proceeds to expansion stroke shown in FIG. 25C and to exhaust stroke shown in FIG. 25D.

FIG. 26A shows a valve lifting characteristic during the compression self-ignition combustion. This characteristic curve shown in FIG. 26A is employed in the fifth embodiment and is arranged to sufficiently retard the closing timing of exhaust valve 13 after TDC during exhaust stroke, as compared with a valve lifting characteristic during spark-ignition combustion shown in FIG. 26B. By varying the closing timing of exhaust valve 13, it becomes possible to ensure the spark-ignition combustion and the compression self-ignition combustion.

Figure 27A:
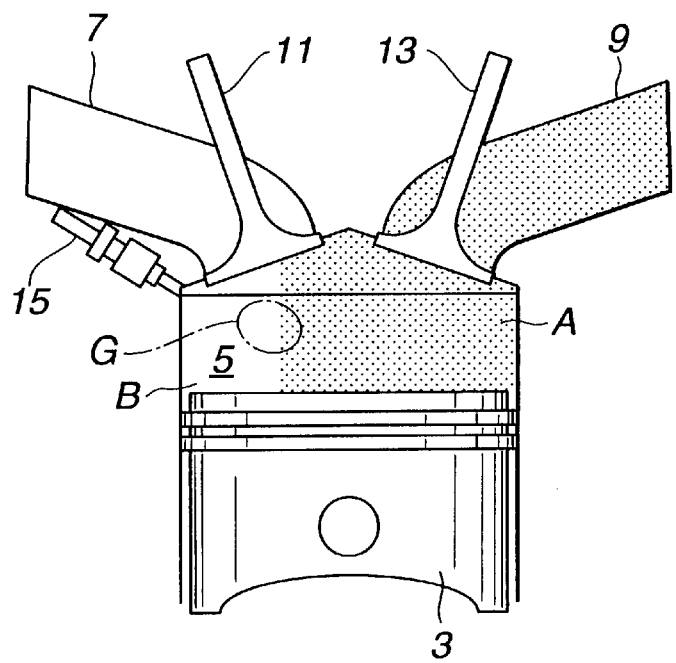
FIG. 27A is a side cross-sectional view showing a gas distribution and a fuel distribution in the combustion chamber when the ratio of the EGR layer is large, according to the fifth embodiment.
Figure 27B:
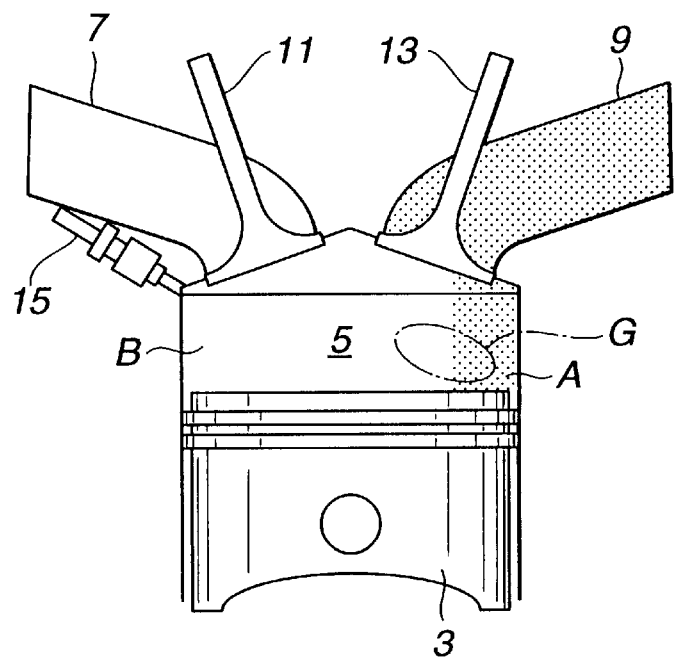
FIG. 27B is a side cross-sectional view showing a side cross-sectional view showing the gas distribution and the fuel distribution in the combustion chamber when the ratio of the EGR layer is small, according to the fifth embodiment.

Referring to FIGS. 27A to 28B, there will be discussed a sixth embodiment according to the present invention. FIGS. 27A and 27B show the compression self-ignition combustions executed by engine 1 according to the sixth embodiment. A basic construction of the sixth embodiment is generally similar to that of the fifth embodiment shown in FIG. 24 except that fuel injector 15 is set at a position offset toward intake port 7 and that the ratio between the EGR layer and the air layer is varied by varying the closing timing of exhaust valve 13, as shown in FIGS. 27A and 27B.

FIGS. 28A and 28B show valve lifting characteristics during the compression self-ignition combustion according to the sixth embodiment. The valve lifting characteristic shown in FIG. 28A is employed to increase the ratio of the EGR layer by retarding the closing timing of exhaust valve 13 toward intake BDC (bottom dead center), as compared with the timing shown in FIG. 26A. This retard arrangement increases the quantity of the EGR gas A to be led into combustion chamber 5 and obtains the condition shown in FIG. 27A. On the other hand, the valve lifting characteristic shown in FIG. 28B is employed to decrease the ratio of the EGR layer by advancing the closing timing of exhaust valve toward the exhaust TDC (top dead center), as compared with the closing timing shown in FIG. 26B. This advance arrangement decreases the quantity of the EGR gas A to be led into combustion chamber 5 and obtains the condition shown in FIG. 27B. As mentioned above, by controlling the closing timing of exhaust valve 13, the ratio between the EGR layer and the air layer can be varied. Therefore, it becomes possible to execute the compression self-ignition combustion within a wider engine operation region. Further, fuel injector 15 is provided at a position offset from the center toward the position near the intake port 7. Therefore, even if the boundary zone between the EGR layer and the air layer is moved between the intake port near position shown in FIG. 27A and the exhaust port near position shown in FIG. 27B, it becomes possible to move the fuel injection area in combustion chamber 5 so as to be located at the varied boundary zone as shown by the areas G in FIGS. 27A and 27B. That is, when the boundary zone between the EGR layer and the air layer is located near fuel injector 15 as shown in FIG. 27A, the fuel is injected at the timing when piston 3 is located near the compression TDC where the back pressure in combustion chamber 5 is high. When the boundary zone is located at a position apart from fuel injection 15 FIG. 27B, the fuel is injected at the earlier timing as compared with the timing shown in FIG. 27A.

Figure 29:
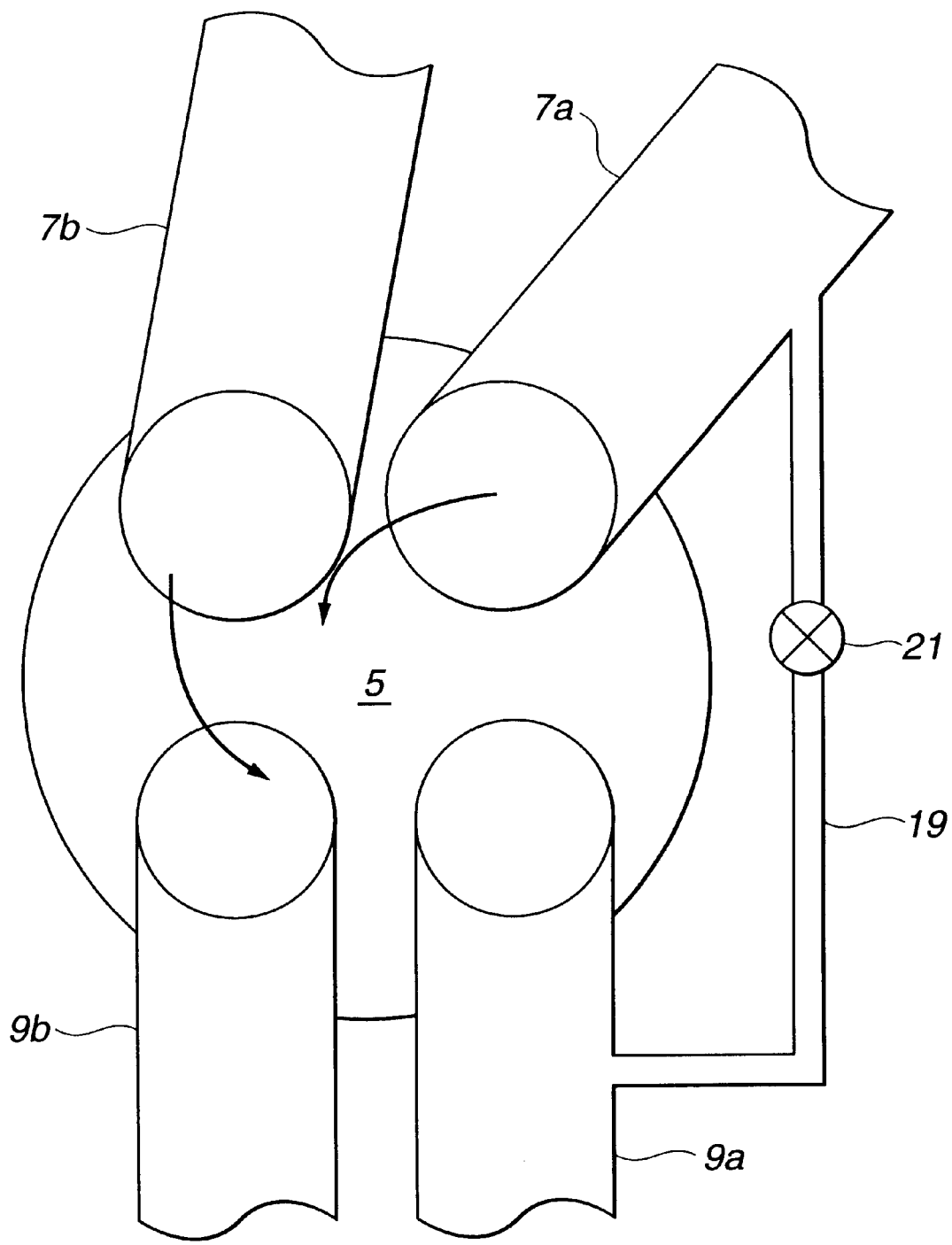
FIG. 29 is a top view schematically showing a cylinder, intake ports and exhaust ports of the engine according to a seventh embodiment of the present invention.

With reference to FIGS. 29 to 33, there will be discussed a seventh embodiment according to the present invention. FIG. 29 shows a top view of engine 1 according to the seventh embodiment, corresponding to FIG. 2 of the first embodiment. A basic construction of the sixth embodiment is generally similar to that of the fifth embodiment shown in FIG. 24 except for the following arrangement. The seventh embodiment is characteristically arranged such that two intake ports 7a and 7b are inclinedly connected to combustion chamber 5 so as to swirl the gas along the inner surface of cylinder in combustion chamber 5 as shown by arrows of FIG. 29. That is, engine 1 of the seventh embodiment is arranged to generate a swirl flow in combustion chamber 5. Instead of this arrangement of intake ports 7a and 7b, helical ports may be employed.

Figure 30:
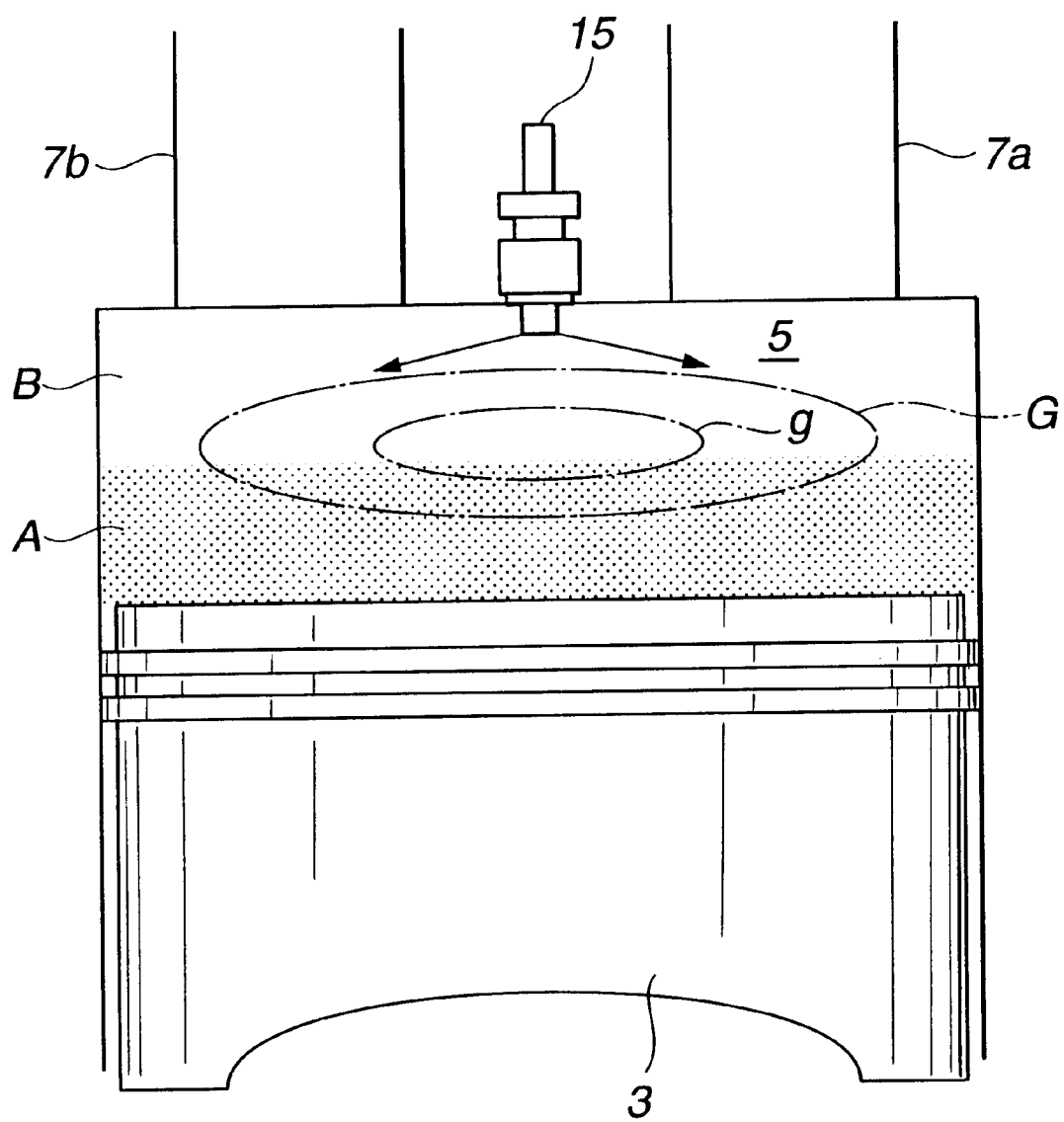
FIG. 30 is a side cross sectional view a gas distribution and a fuel distribution in the combustion chamber according to the seventh embodiment.

FIG. 30 shows a gas distribution in combustion chamber 5 of engine 1 according to the seventh embodiment. In FIG. 30, a lower layer contacting with a top surface of piston 3 is the EGR layer produced by EGR gas A, and an upper layer is the air layer produced by fresh air B. It is understood that the locations of the EGR layer and the air layer may be exchanged with each other. Fuel injector 15 is disposed at a center and upper position of combustion chamber 5 and is arranged to inject the fuel to the boundary zone between the EGR layer and the air layer. Fuel injector 15 injects the fuel in the generally horizontal direction shown by arrows of FIG. 30 at the timing when piston 3 reaches a position near the compression TDC. This arrangement enables the fuel to be firmly injected to the boundary zone.

The stratification of the EGR layer and the air layer at the upper and lower sides is achieved by differentiating the time periods when the respective intake valves 11 for the respective intake ports 7a and 7b are open, as shown in FIGS. 31A and 31B. More specifically, ECU 23 controls variable valve timing mechanisms 43 such that intake valve 11 for first intake port 7a, to which EGR passage 19 is connected, is opened prior to intake valve 11 for second intake port 7b. This operational arrangement enables the EGR layer to be produced at the lower side in combustion chamber 5 through the operation of supplying EGR gas A to the lower side. Following to opening of intake valve 11 for first intake port 7a, intake valve 11 for second intake port 7b is opened to supply fresh air B to the upper side on the EGR layer. This supply of fresh air B to the upper side produces the air layer on the EGR layer.

FIG. 31A shows a valve lifting characteristic which is performed to increase the ratio of the EGR layer as compared with the case of FIG. 31B. More specifically, ECU 23 controls variable valve timing mechanism 43 for each intake valve 11 such that the opening time period of intake valve 11 for first intake port 7a is elongated and the opening time period of exhaust valve 13 for second intake port 7b is shortened, as compared with the time periods shown in FIG. 31B.

As a modification of FIGS. 31A and 31B, the operation arrangement of intake valves 11 and exhaust valves may be rearranged to first open the left intake valve 11 for generating the air layer and to next open the right intake valve 11 for generating the EGR layer so as to locate the air layer at the lower side contacting with the upper surface of piston 3 and to locate the EGR layer at the upper side on the air layer. Further, this stratification of the EGR layer and the air layer is achieved only by differentiating the opening and closing timings of two intake valves 11 without generating swirl flow in combustion chamber 5. Furthermore, this stratification is achieved only by generating swirl flow in combustion chamber without differentiating the opening and closing timings of two intake valves 11.

Generally, since the heat in combustion chamber 5 is radiated from the inner wall of each cylinder to the external, the temperature gradient takes the largest value in the vicinity of the inner wall. Accordingly, by injecting the fuel to the portion near the inner wall, the self-ignition is started at the large temperature-gradient region where the air-fuel ratio is rich. Further, the self-ignition is sequentially generated from the large temperature-gradient region toward the small temperature-gradient region to occur slow combustion. Therefore, the knocking due to the radical combustion is prevented.

Figure 32A:
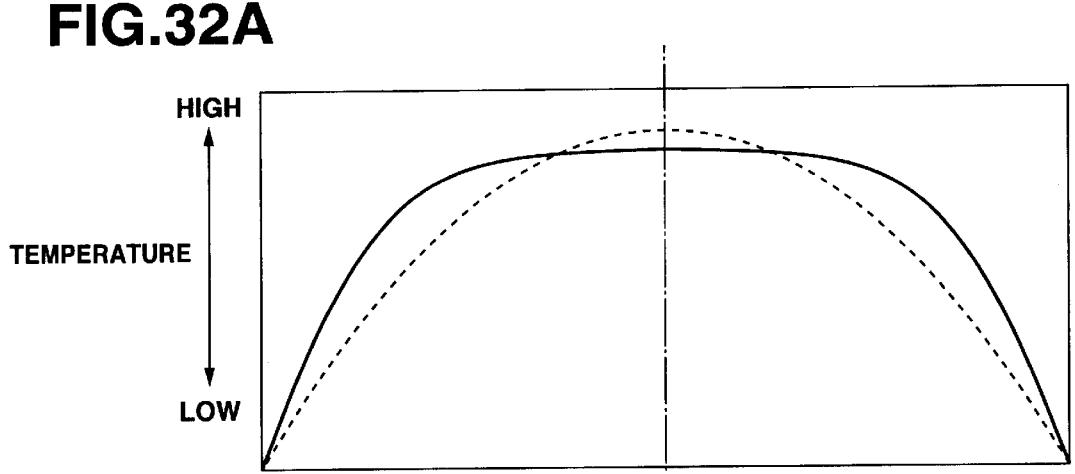
FIG. 32A is a graph showing a temperature gradient in the combustion chamber according to the seventh embodiment.
Figure 32B:
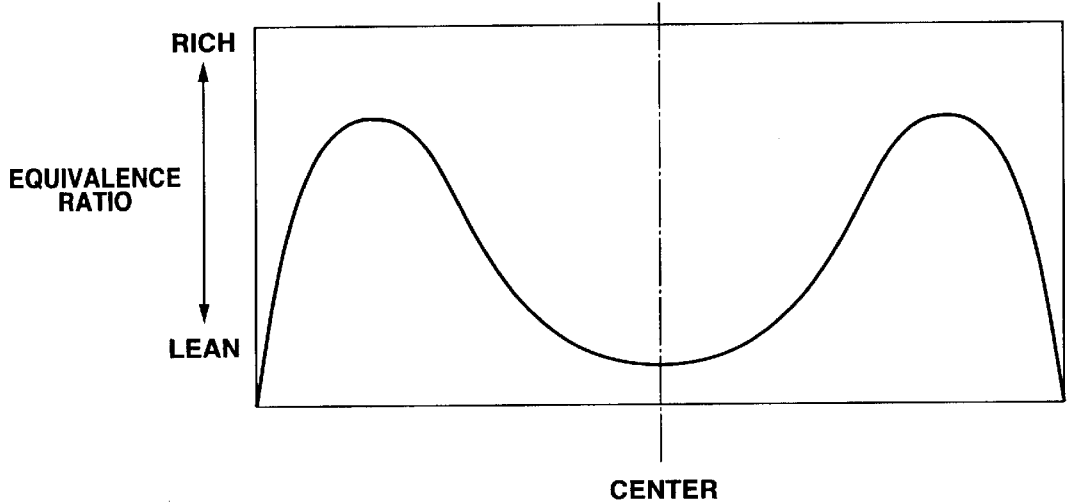
FIG. 32B is a graph showing an equivalence ratio in the combustion chamber according to the seventh embodiment.

To produce swirl flow in combustion chamber 5 effectively functions to produce the large temperature-gradient region in combustion chamber 5. FIG. 32A shows the variation of the temperature gradient in combustion chamber 5 along the diametrical line crossing the center. In FIG. 32A, a continuous line shows the temperature gradient in case that swirl is generated, and a broken line shows the temperature gradient in case that no swirl is generated. As is clear from FIG. 32A, when swirl is generated, the heat is positively transferred to the external by the swirl flow flowing along the inner wall. Accordingly, by enriching the air-fuel ratio at the area near the inner wall through the fuel injection to the area near the inner wall as shown in FIG. 32B, the knocking due to the radical combustion is prevented.

Figure 33:
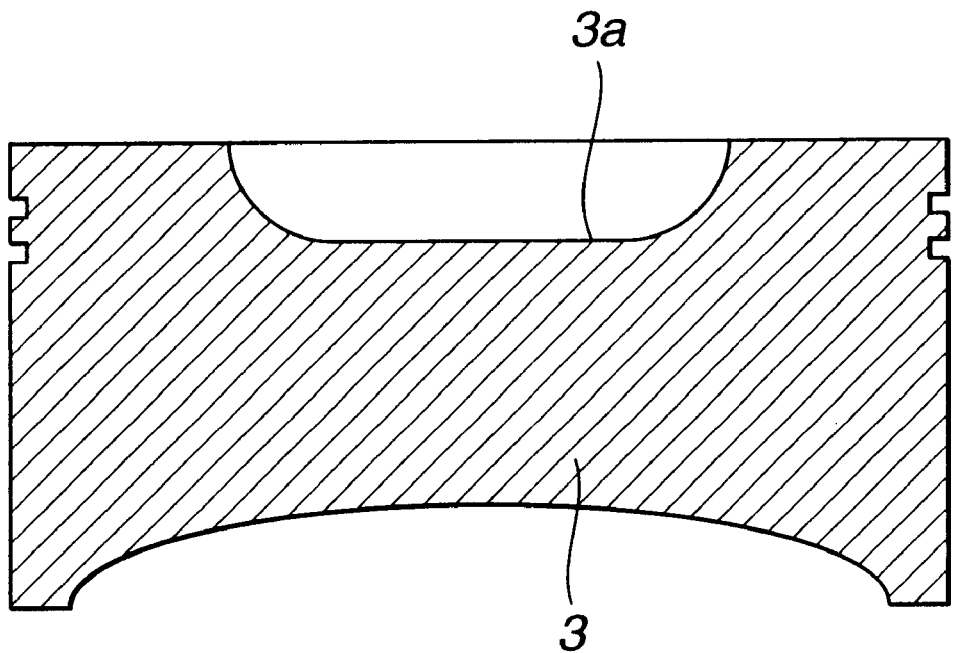
FIG. 33 is a cross section view showing a shape of the piston for generating the temperature gradient thereby.

Further, by forming a top portion of piston 3 so as to have a depressed portion 3a as shown in FIG. 33, it becomes possible to maintain the center portion at the high temperature condition. This arrangement enables the temperature gradient at the portion near the inner wall to be large.

Figure 34:
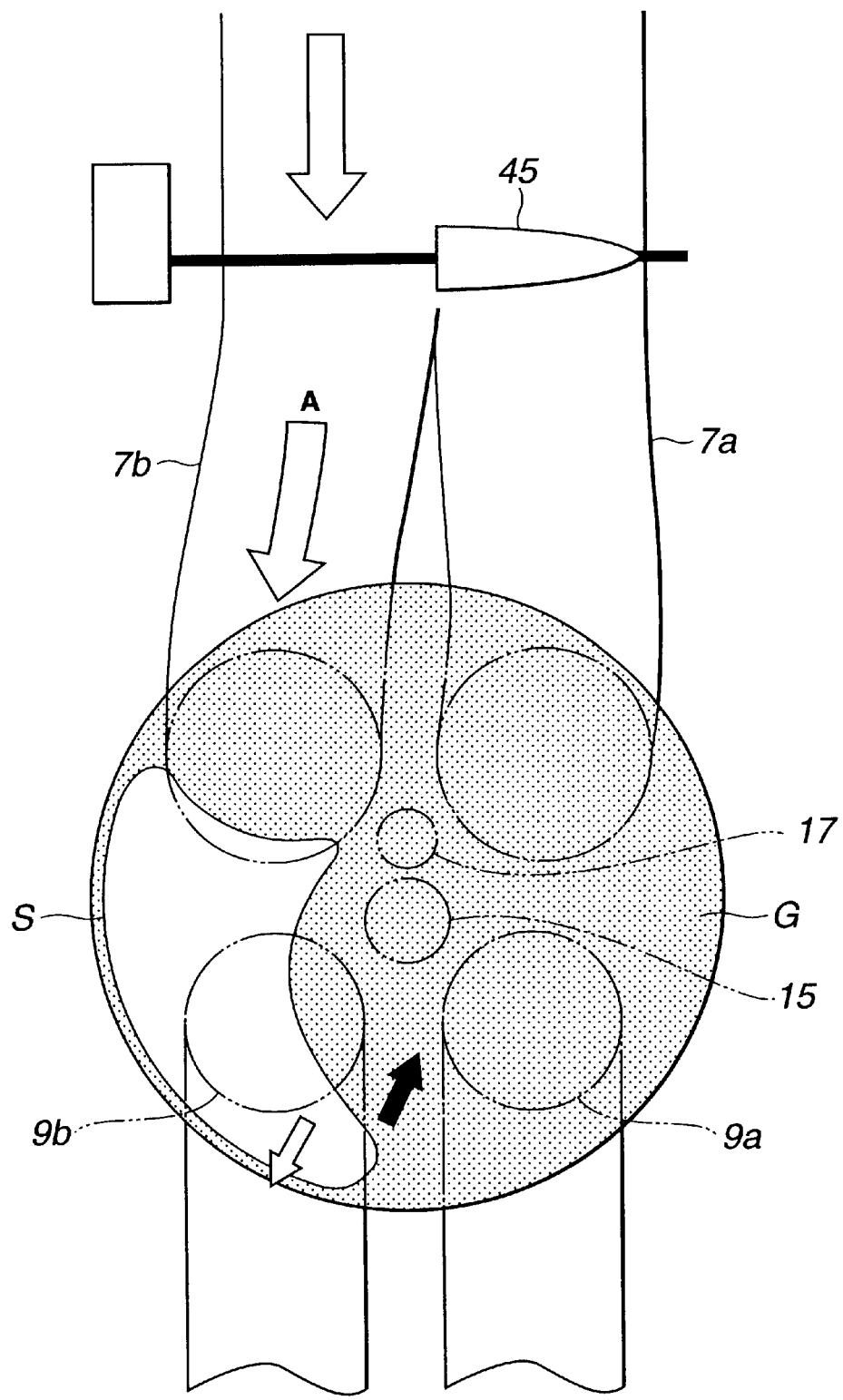
FIG. 34 is a top view schematically showing a cylinder, intake ports and exhaust ports of the engine according to an eighth embodiment of the present invention.
Figure 35:
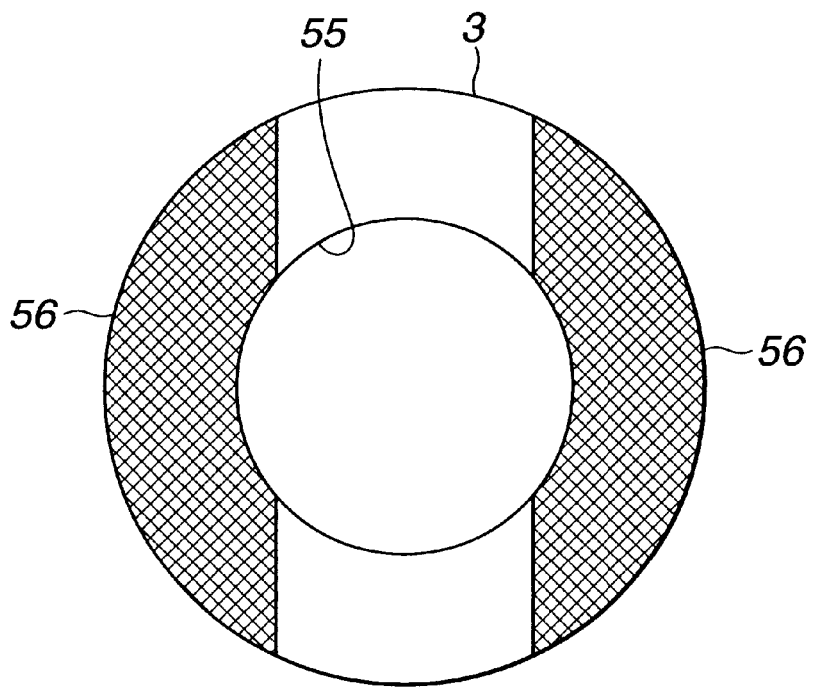
FIG. 35 is a top view showing a piston employed in the engine according to the eighth embodiment of the present invention.
Figure 36:
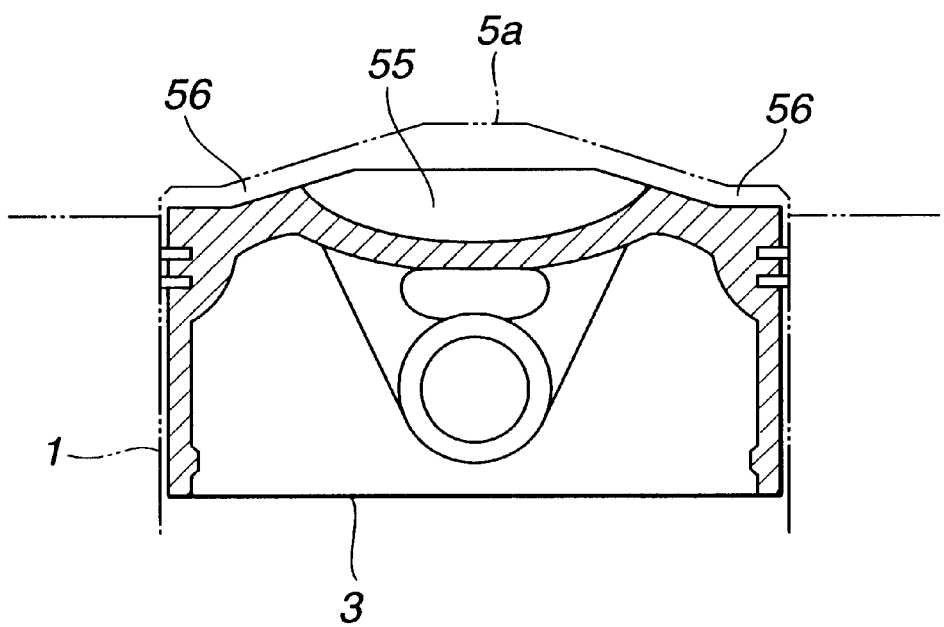
FIG. 36 is a side cross sectional view of the piston of FIG. 35.
Figure 37:
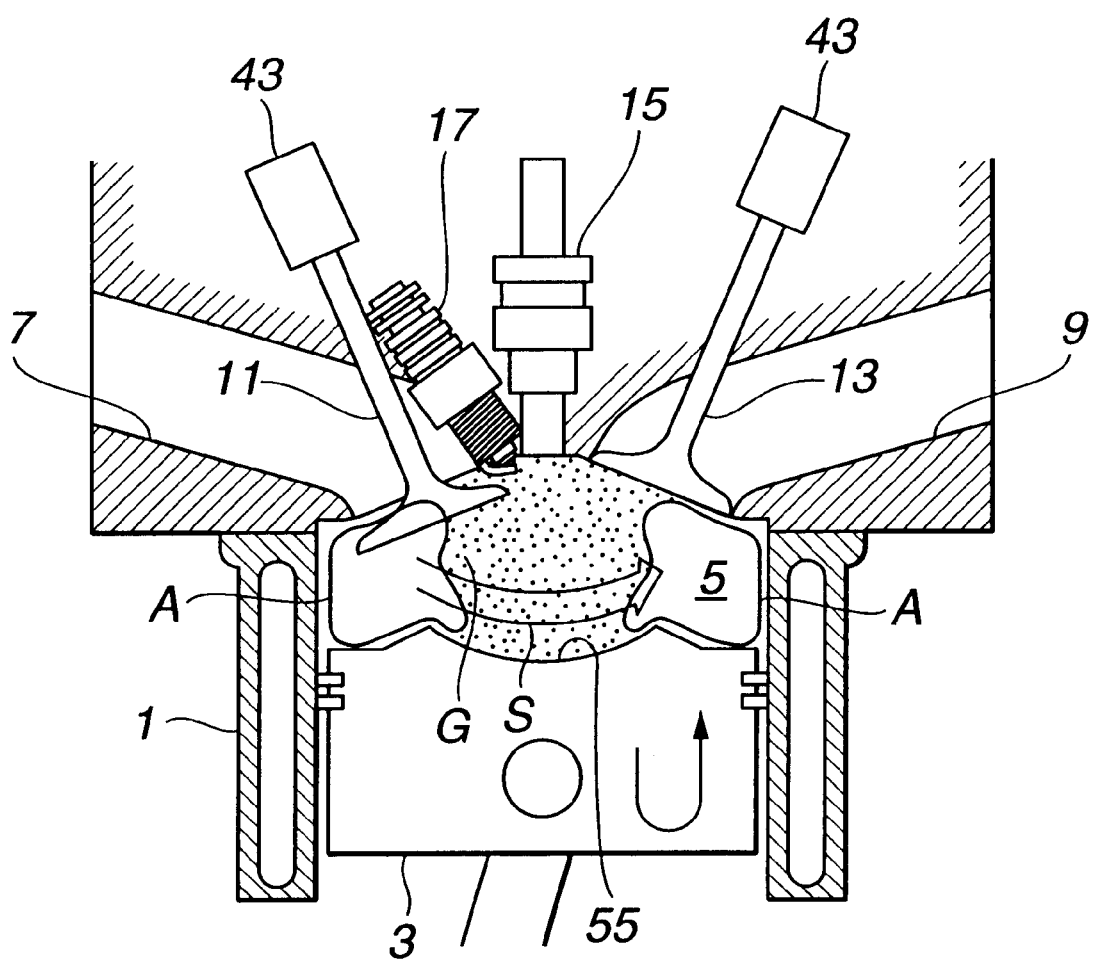
FIG. 37 is a side cross sectional view a gas distribution and a fuel distribution in the combustion chamber according to the eighth embodiment.

Referring to FIGS. 34 to 37, there is shown an eighth embodiment of the engine according to the present invention. The eighth embodiment is arranged to have no EGR passage 19 and no EGR control valve 21 as shown in FIG. 34. Further, each of intake valves 11 and exhaust valves 13 is operated by a variable valve timing mechanism 43 as is similar to the fifth embodiment shown in FIG. 24. Accordingly, inner EGR gas is remained in combustion chamber 5 by controlling the opening and closing timing of exhaust valve 13. It will is understood that variable valve timing mechanism 43 may be of an electromagnetic valve drive mechanism employing electromagnetic coils or a known mechanical valve drive mechanism. Furthermore, as shown in FIG. 34, the eighth embodiment is arranged to provide a swirl control valve 45 at an inlet of first intake port 7a. ECU 23 controls the opening degree of swirl control valve 45 by outputting a control signal to swirl control valve 45. By controlling the opening degree of swirl control valve 45, the swirl of fresh air directing to combustion chamber 5 is controlled. Further, fuel injector 15 is disposed at an upper and center portion of combustion chamber 5, and ignition plug 17 is disposed in the vicinity of fuel injector 15, as shown in FIG. 37.

FIGS. 35 and 36 show a shape of a top surface of piston 3 employed in the eighth embodiment. As is clearly shown in FIGS. 35 and 36, a depressed portion 55 having a spherical surface is formed at a center portion of the top surface of piston 3. Depressed portion 55 functions to maintain the flowing force generated during the intake stroke until the second half of the compression stroke and to ensure a necessary combustion chamber volume. A portion surrounding the depressed portion 55 is formed along a pent-roof shape of an upper portion 5a of combustion chamber 5 (the upper portion is defined by a cylinder head). Further, a part of the depress-portion surrounding portion of piston 3 has a pair of squish areas 56 for generating a squish flow at portions facing with intake valves 11 and exhaust valves 13, respectively. Squish areas 56 of piston 3 function to generate a squish flow.

FIG. 34 shows a condition during a stratification process of fresh air and inner EGR gas when engine 1 operates under the compression self-ignition combustion. During the compression self-ignition combustion, the valve timings of intake and exhaust valves 11 and 13 are overlapped by the control operation of ECU 23 so that the high-temperature combustion gas remains in combustion chamber 5 as inner EGR gas G.

Further, when a throttle valve of engine 1 is put in full open condition and when swirl control valve 45 closes first intake port 7a, fresh air is supplied through second port 7b into combustion chamber 5 as shown by an arrow A of FIG. 34, and therefore a swirl flow S is generated in combustion chamber 5. It will be understood that second intake port 7b may be a helical port so as to amplify the magnitude of the swirl flow.

Due to the swirl flow, fresh air A supplied to combustion chamber 5 swirls along the inner wall of cylinder. Since fresh air A is low in temperature and heavy in density as compared with inner EGR gas G, a centrifugal force of fresh air A due to swirl is greater than that of inner EGR gas G due to swirl. As a result, fresh air A is located at an outer peripheral portion in combustion chamber 5, and inner EGR gas G is located at a center portion in combustion chamber 5. That is, fresh air layer and inner EGR layer are stratified in combustion chamber as shown in FIG. 37.

Inner EGR gas G has properties of high-temperature and low density. Fresh air A has properties of low-temperature and high density. Therefore, a centrifugal force caused by the swirl flow becomes larger than that of the inner EGR gas G. Then, by injecting the fuel to the aimed position, the compression self-ignition is executed. Thus, by stratifying the EGR layer and the air layer so as to locate the inner EGR layer at a center portion in combustion chamber 5 and to locate the air layer at the portion surrounding the inner EGR layer, and by injecting the fuel to the aimed position, the compression self-ignition is smoothly executed.

In the above-discussed embodiments, the boundary zone between the EGR layer and the air layer corresponds to a region where the temperature gradient is large in combustion chamber 5. Therefore, even if the EGR layer is not produced, by injecting the fuel to the large temperature gradient region in combustion chamber 5 of the air layer, the advantages similar to those of the above-discussed embodiments are obtained.

The engine 1 according to the preferred embodiments of the present invention is arranged to stratify a high temperature gas layer and a low temperature gas layer in combustion chamber 5 and to inject fuel to both layers. Accordingly, the fuel injected to the high temperature gas layer increases its temperature due to the compressing operation of the compression stroke, and firmly generates the self-ignition. During this self-ignition at the high temperature gas layer, the fuel to be combusted is a part of the injected fuel, and therefore the combustion proceeds mildly without becoming excessively violent. On the other hand, even if the fuel injected to the low temperature gas layer insufficiently increases its temperature, it is firmly ignited due to the increases in temperature and in pressure caused by the combustion at the high temperature gas layer.

Further, the engine 1 according to the preferred embodiments of the present invention is arranged to stratify a high temperature gas layer and a low temperature gas layer in combustion chamber 5 and to inject the fuel toward the boundary zone between the high temperature gas layer and the low temperature gas layer. Accordingly, at the boundary zone between the high temperature gas layer and the low temperature gas layer, a temperature gradient that the temperature decreases from the side of the high temperature gas layer toward the side of the low temperature gas layer. After the self-ignition is generated at the side of the high temperature side in the boundary zone, the self-ignition sequentially proceeds to the low temperature according to the temperature gradient. Therefore, the combustion thereby becomes mild.

This application is based on a prior Japanese Patent Applications No. 2000-20549 filed on Jan. 28, 2000 and No. H11(1999)-355101 filed on Dec. 14, 1999 in Japan. The entire contents of Japanese Patent Applications Nos. 2000-20549 and H11(1999)-355101 are hereby incorporated by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A compression self-ignition gasoline engine comprising:

a stratifying device stratifying gas in a combustion chamber of the engine;

a fuel injector directly injecting fuel in the combustion chamber; and a controller connected to said stratifying device and said fuel injector, said controller controlling said stratifying device to produce a high temperature gas layer of a high temperature gas and a low temperature gas layer of a low temperature gas in the combustion chamber, said controller controlling said fuel injector to inject the fuel to both the high temperature gas layer and the low temperature gas layer.

2. The compression self-ignition gasoline engine as claimed in claim 1, wherein said controller controls said fuel injector to inject the fuel toward a boundary zone between the high temperature gas layer and the low temperature gas layer.

3. The compression self-ignition gasoline engine as claimed in claim 1, wherein the high temperature gas layer is a layer which mainly includes combustion gas, and the low temperature gas layer is a layer which mainly includes fresh air.

4. The compression self-ignition gasoline engine as claimed in claim 1, further comprising two intake ports connected to the combustion chamber, and an exhaust gas recirculation passage connecting one of the intake ports and an exhaust port connected to the combustion chamber to recirculate exhaust gas to the intake port.

5. The compression self-ignition gasoline engine as claimed in claim 4, further comprising two intake valves installed to the two intake ports, respectively, wherein a valve opening timing of one of the two intake valves is differentiated from a valve opening timing of the other of the two intake valves.

6. The compression self-ignition gasoline engine as claimed in claim 5, wherein said controller sets an overlap period when a valve opening period of the exhaust valve is overlapped with a valve opening period of the intake valve, by setting a valve closing timing of an exhaust valve installed to the exhaust port at a timing on the intake stroke of the engine after a piston passes an exhaust top dead center, wherein during the overlap period, the low temperature gas layer is produced by supplying air through the intake port into the combustion chamber, and the high temperature gas layer is produced by directly returning the exhaust gas from the exhaust passage to the combustion chamber.

7. The compression self-ignition gasoline engine as claimed in claim 1, further comprising an intake port which is partitioned by a partition wall into two passages, wherein one of the partitioned passages is connected to an exhaust gas recirculation passage connected to an exhaust port connected to the combustion chamber to recirculate exhaust gas to the one of the partitioned passages.

8. The compression self-ignition gasoline engine as claimed in claim 1, wherein said controller decreases a ratio of the high temperature gas layer to the low temperature gas layer according to the increase of an engine load.

9. The compression self-ignition gasoline engine as claimed in claim 1, wherein said controller increases a ratio of the high temperature gas layer to the low temperature gas layer according to the increase of an engine speed.

10. The compression self-ignition gasoline engine as claimed in claim 1, wherein said controller varies a fuel injection timing of said fuel injector according to a variation of a ratio between the high temperature gas layer and the low temperature gas layer.

11. The compression self-ignition gasoline engine as claimed in claim 1, wherein said stratifying device includes at least one of an exhaust gas recirculation valve, an intake valve, an exhaust valve, a flow control valve, and an opening degree of a swirl control valve.

12. The compression self-ignition gasoline engine as claimed in claim 1, wherein said stratifying device includes a structure of two intake ports connected to the combustion chamber.

13. A compression self-ignition gasoline engine comprising:

stratifying mean for stratifying gas in a combustion chamber of the engine, said stratifying means producing a high temperature gas layer of a high temperature gas and a low temperature gas layer of a low temperature gas in the combustion chamber; and fuel injecting means for injecting fuel to both the high temperature gas layer and the low temperature gas layer.

14. Method of controlling a compression self-ignition gasoline engine comprising:

stratifying gas in a combustion chamber of the engine into a high temperature gas layer and a low temperature gas layer; and injecting fuel to both the high temperature gas layer and the low temperature gas layer.

\* \* \* \* \*